US010802730B2

(12) United States Patent
Watanabe et al.

(10) Patent No.: US 10,802,730 B2
(45) Date of Patent: Oct. 13, 2020

(54) SEMICONDUCTOR DEVICE AND RECONFIGURATION CONTROL METHOD OF THE SAME

(71) Applicant: RENESAS ELECTRONICS CORPORATION, Tokyo (JP)

(72) Inventors: Yasumasa Watanabe, Tokyo (JP); Mitsuhiro Ono, Tokyo (JP); Toshiro Fujisaki, Tokyo (JP); Kenji Kimura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 85 days.

(21) Appl. No.: 16/152,207

(22) Filed: Oct. 4, 2018

(65) Prior Publication Data

US 2019/0171377 A1 Jun. 6, 2019

(30) Foreign Application Priority Data

Dec. 5, 2017 (JP) .................................. 2017-233116

(51) Int. Cl.
*G06F 3/06* (2006.01)
*G06F 13/00* (2006.01)
(Continued)

(52) U.S. Cl.
CPC .......... *G06F 3/0625* (2013.01); *G06F 1/3237* (2013.01); *G06F 1/3253* (2013.01);
(Continued)

(58) Field of Classification Search
CPC ......... G06F 3/00; G06F 3/0625; G06F 13/362
See application file for complete search history.

(56) References Cited

U.S. PATENT DOCUMENTS

2001/0027550 A1* 10/2001 Suzuki .................. G11B 20/10
  714/763
2005/0132146 A1* 6/2005 Kim .................... G06F 13/1647
  711/151
(Continued)

FOREIGN PATENT DOCUMENTS

JP   2008-219806 A   9/2008
WO   2009/060567 A1  5/2009

OTHER PUBLICATIONS

Extended European Search Report issued in corresponding European Patent Application No. 18201272.4-1224, dated Apr. 16, 2019.

*Primary Examiner* — Getente A Yimer
(74) *Attorney, Agent, or Firm* — McDermott Will & Emery LLP

(57) ABSTRACT

Power consumption of a semiconductor device is reduced. A semiconductor device according to an embodiment includes a plurality of circuits, a bus circuit including a plurality of buffers that temporarily store communication data between the circuits and a plurality of arbitration circuits that arbitrate an access between the circuits and the buffers, a storage unit that stores information based on a use state of the buffers during communication between the circuits and configuration information including designation of unused circuits that are not used for the communication from among the circuits, and a control circuit that controls the bus circuit so as to stop use of unused buffers that are not used for the communication from among the buffers and at least a partial configuration in arbitration circuits corresponding to the unused circuits from among the arbitration circuits based on the configuration information.

10 Claims, 22 Drawing Sheets

(51) Int. Cl.
  *G06F 1/3237* (2019.01)
  *G06F 13/16* (2006.01)
  *G06F 13/40* (2006.01)
  *G06F 1/3234* (2019.01)

(52) U.S. Cl.
  CPC .......... *G06F 3/0634* (2013.01); *G06F 3/0659* (2013.01); *G06F 3/0679* (2013.01); *G06F 13/00* (2013.01); *G06F 13/1668* (2013.01); *G06F 13/4068* (2013.01)

(56) References Cited

U.S. PATENT DOCUMENTS

| | | | |
|---|---|---|---|
| 2010/0042751 A1* | 2/2010 | Ishino | G06F 13/1694 710/8 |
| 2010/0109747 A1 | 5/2010 | Datta et al. | |
| 2015/0078095 A1* | 3/2015 | Park | G11C 16/08 365/185.22 |
| 2016/0275028 A1* | 9/2016 | Ishikawa | G06F 13/4068 |

* cited by examiner

FIG. 20

| OPERATION INFORMATION A | INTERRUPT ID0 |
|---|---|
| ROUTING WHEN USING BUS (MASTER CIRCUIT, SLAVE CIRCUIT) | |
| OPERATION INFORMATION B | INTERRUPT ID0 |
| MAXIMUM NUMBER OF USED BUFFER ENTRIES | |
| OPERATION INFORMATION A | INTERRUPT ID1 |
| ROUTING WHEN USING BUS (MASTER CIRCUIT, SLAVE CIRCUIT) | |
| OPERATION INFORMATION B | INTERRUPT ID1 |
| MAXIMUM NUMBER OF USED BUFFER ENTRIES | |
| OPERATION INFORMATION A | INTERRUPT ID2 |
| ROUTING WHEN USING BUS (MASTER CIRCUIT, SLAVE CIRCUIT) | |
| OPERATION INFORMATION B | INTERRUPT ID2 |
| MAXIMUM NUMBER OF USED BUFFER ENTRIES | |

↑

| CONFIGURATION INFORMATION A | INTERRUPT ID0 |
|---|---|
| UNUSED CIRCUITS (MASTER CIRCUIT, SLAVE CIRCUIT) | |
| CONFIGURATION INFORMATION B | INTERRUPT ID0 |
| UPPER LIMIT NUMBER OF USED BUFFERS UNUSED BUFFER ENTRY NUMBERS | |
| CONFIGURATION INFORMATION A | INTERRUPT ID1 |
| UNUSED CIRCUITS (MASTER CIRCUIT, SLAVE CIRCUIT) | |
| CONFIGURATION INFORMATION B | INTERRUPT ID1 |
| UPPER LIMIT NUMBER OF USED BUFFERS UNUSED BUFFER ENTRY NUMBERS | |
| CONFIGURATION INFORMATION A | INTERRUPT ID2 |
| UNUSED CIRCUITS (MASTER CIRCUIT, SLAVE CIRCUIT) | |
| CONFIGURATION INFORMATION B | INTERRUPT ID2 |
| UPPER LIMIT NUMBER OF USED BUFFERS UNUSED BUFFER ENTRY NUMBERS | |

SEMICONDUCTOR DEVICE AND RECONFIGURATION CONTROL METHOD OF THE SAME

CROSS-REFERENCE TO RELATED APPLICATIONS

The disclosure of Japanese Patent Application No. 2017-233116 filed on Dec. 5, 2017 including the specification, drawings and abstract is incorporated herein by reference in its entirety.

BACKGROUND

The present invention relates to a semiconductor device and a reconfiguration control method thereof, and for example, relates to a semiconductor device and a reconfiguration control method thereof, which perform reconfiguration based on configuration information.

In recent years, the number of peripheral modules mounted on a semiconductor device including a MCU (Micro Control Unit) and the like increases. As the number of peripheral modules increases, the scale of a bus circuit also increases in order to cover all communication paths between the modules. As techniques for dynamically reconfiguring a logical configuration of a semiconductor device, for example, there are Japanese Unexamined Patent Application Publication No. 2008-219806 and International Publication No. 2009/060567.

In the technique according to Japanese Unexamined Patent Application Publication No. 2008-219806, first, a programmable logic is configured as a first communication processing circuit by using configuration data of a first communication processing system when a microcomputer is initialized. When there is no response to communication performed by the first communication processing circuit, the programmable logic is reconfigured as a second communication processing circuit by using configuration data of a second communication processing system. On the other hand, when there is response to the communication performed by the first communication processing circuit, the microcomputer advances to normal processing without using the configuration data of the second communication processing system. In this way, the use of unnecessary configuration data out of a plurality of configuration data is avoided, so that it is possible to suppress consumption of resources of the programmable logic.

The technique according to International Publication No. 2009/060567 is to reconfigure a logical unit and a buffer unit in a reconfiguration circuit according to, for example, a memory band width calculated by monitoring an access command.

SUMMARY

Semiconductor devices in recent years have a problem that the power consumption is increased as the number of peripheral modules increases and the scale of the bus circuit increases. Here, the technique according to Japanese Unexamined Patent Application Publication No. 2008-219806 can determine whether or not configuration data for configuring a specific logic circuit is required. However, the technique does not reduce the power consumption of the programmable logic reconfigured by the required configuration data. The technique according to International Publication No. 2009/060567 is to adjust a configuration ratio between the logical unit and the buffer unit in the reconfiguration circuit. However, the technique is not to reduce the power consumption of the reconfiguration circuit itself.

The other problems and novel features will become apparent from the description of the present specification and the accompanying drawings.

According to an embodiment, a semiconductor device includes a storage unit that stores information based on a use state of a plurality of buffers during communication between a plurality of circuits and configuration information including designation of unused circuits, and a control circuit that controls a bus circuit so as to stop use of unused buffers that are not used for the communication from among the plurality of buffers and at least a partial configuration in arbitration circuits corresponding to the unused circuits based on the configuration information.

According to the embodiment, it is possible to reduce the power consumption of the semiconductor device.

BRIEF DESCRIPTION OF THE DRAWINGS

FIG. 20 is a diagram showing a relationship between operation information and configuration information according to the third embodiment.

DETAILED DESCRIPTION

Figure 1:
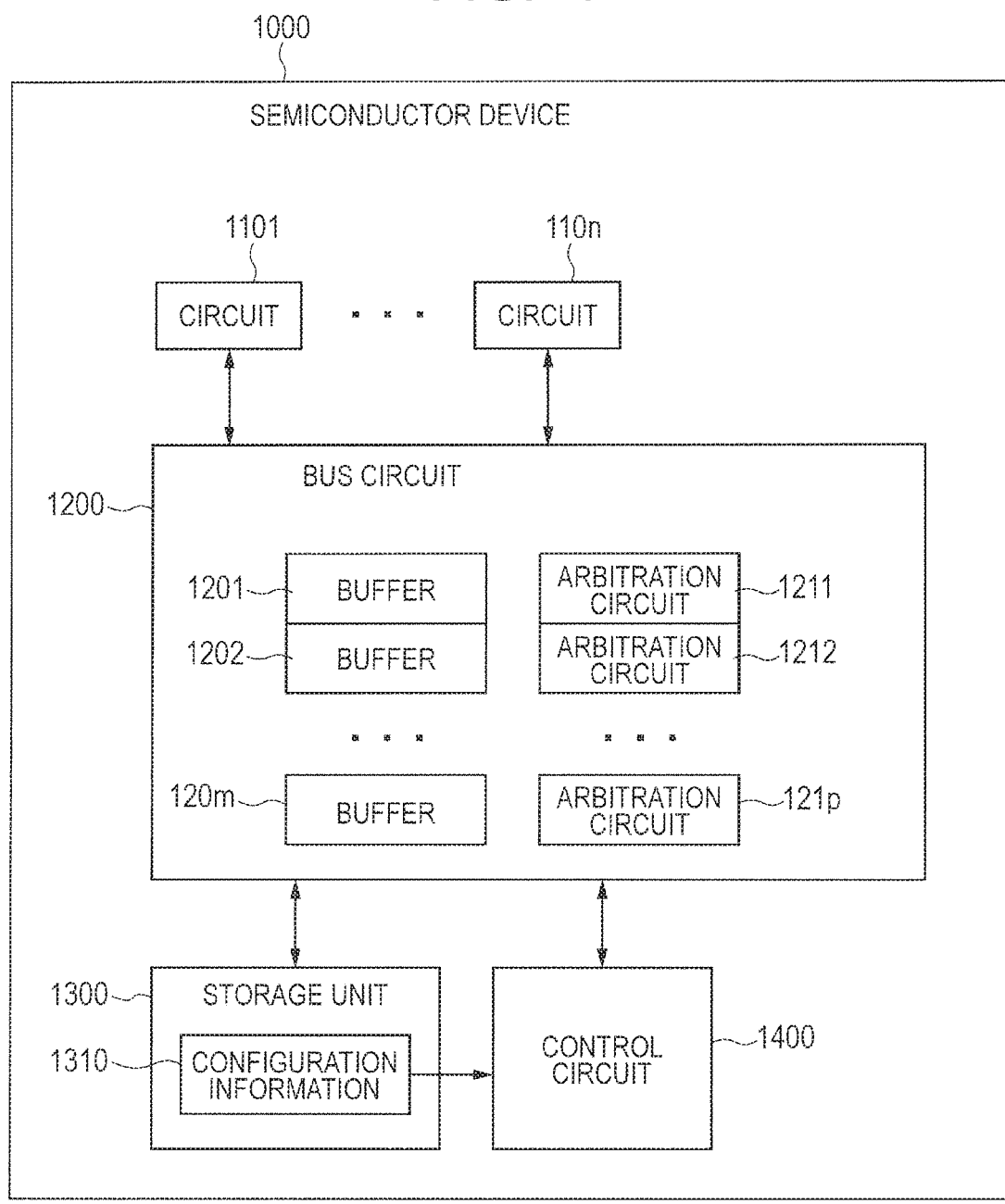
FIG. 1 is a block diagram showing a configuration of a semiconductor device according to a first embodiment.

For clarity of explanation, the following description and drawings are appropriately omitted and simplified. The components shown in the drawings as functional blocks that perform various processing can be formed by a CPU (Central Processing Unit), a memory, and other circuits as hardware and are realized by a program and the like loaded in a memory as software. Therefore, it should be understood by those skilled in the art that the functional blocks can be realized in various forms by only hardware, only software, or a combination of these, and the functional blocks are not limited to any one of hardware, software, and a combination of these. In the drawings, the same components are denoted by the same reference symbols and redundant description is omitted as appropriate.

The program described above can be stored in various types of non-transitory computer readable media and supplied to a computer. The non-transitory computer readable media include various types of substantial recording media. Examples of the non-transitory computer readable media include a magnetic recording medium (for example, flexible disk, magnetic tape, and hard disk drive), a magneto-optical recording medium (for example, magneto-optical disk), a CD-ROM (Read Only Memory), a CD-R, a CD-R/W, a semiconductor memory (for example, mask ROM, PROM (Programmable ROM), EPROM (Erasable PROM), flash ROM, and RAM (Random Access Memory)). The program may be supplied to a computer by various types of transitory computer readable media. Examples of the transitory computer readable media include an electrical signal, an optical signal, and an electromagnetic wave. The transitory computer readable media can supply the program to a computer through a wired communication path such as an electrical wire and an optical fiber or a wireless communication path.

<First Embodiment>

FIG. 1 is a block diagram showing a configuration of a semiconductor device 1000 according to a first embodiment. The semiconductor device 1000 includes a plurality of circuits 1101 to 110n (n is a natural number greater than or equal to 2), a bus circuit 1200, a storage unit 1300, and a control circuit 1400. For example, the semiconductor device 1000 is mounted with a processor or the like and executes specific software. The circuit 1101 and the like are circuit blocks of a peripheral module, a processor, a communication module, or the like.

The bus circuit 1200 is a signal path that couples the circuits 1101 to 110n, the storage unit 1300, and the control circuit 1400, and relays communication data between them. The bus circuit 1200 has a plurality of buffers 1201, 1202, . . . , and 120m (m is a natural number greater than or equal to 2) and a plurality of arbitration circuits 1211, 1212, . . . , and 121p (p is a natural number greater than or equal to 2). The buffer 1201 and the like are storage areas that temporarily store communication data between the circuit 1101 and the like. The arbitration circuit 1211 and the like arbitrate accesses between the circuit 1101 and the like and the buffer 1201 and the like.

The storage unit 1300 is a storage circuit that stores configuration information 1310. The configuration information 1310 includes information based on a use state of the buffers 1201 and the like during communication between the circuits 1101 and the like and a designation of unused circuits that are not used for the communication among the circuit 1101 and the like. The control circuit 1400 controls the bus circuit 1200 so as to stop use of unused buffers that are not used for the communication from among the buffer 1201 and the like and at least a partial configuration in arbitration circuits corresponding to unused circuits from among the arbitration circuit 121 and the like based on the configuration information 1310.

In this way, in the present embodiment, it is possible to reduce power consumption of the semiconductor device 1000 by stopping a clock signal supplied to buffers that are not used for communication between circuits and arbitration circuits corresponding to circuits that are not used for communication.

Here, it is preferable that the semiconductor device 1000 has a configuration as described below. The bus circuit further has a selection circuit that selects a buffer to be accessed from among the plurality of buffers. The control circuit instructs stop of supply of the clock signal to the unused buffers among the plurality of buffers and instructs the selection circuit not to select the unused buffers. Thereby, it is possible to reliably stop use of unused buffers by stopping supply of clock of unused buffers in the bus circuit and excluding selection of the unused buffers.

Further, the configuration information may include a maximum number of used buffers in the communication among the plurality of buffers. The control circuit may instruct the selection circuit to select buffers, the number of which is smaller than or equal to the maximum number of used buffers among the plurality of buffers. Thereby, it is possible to suppress unnecessary accesses by preventing the buffers where the clock supply is stopped from being selected by the selection circuit.

Further, the configuration information may further include buffers, the number of which is obtained by subtracting the maximum number of used buffers from a total number of the plurality of buffers, as the unused buffers. Thereby, it is possible to accurately indicate buffers where the clock supply is to be stopped.

Further, it is preferable that the semiconductor device 1000 has a configuration as described below. The unused circuits are circuits that are not used as a master circuit or a slave circuit in the communication among the plurality of circuits. The bus circuit further includes a first arbitration circuit that arbitrates a plurality of accesses from the master circuit or the slave circuit among the plurality of arbitration circuits. The control circuit controls the bus circuit so as to stop supply of the clock signal to at least a partial configuration in the first arbitration circuit corresponding to the designated unused circuits. Thereby, when a certain circuit cannot be a transmission source (master circuit) or a transmission destination (slave circuit) between circuits, it is possible to stop the clock supply to an arbitration circuit that arbitrates a request or a response from the circuit. Then, it is possible to suppress charging and discharging of CMOS (Complementary MOS (metal-oxide-semiconductor)) by stopping the clock supply and reduce dynamic power consumption.

Further, the bus circuit may further include a second arbitration circuit that arbitrates a plurality of accesses to the master circuit or the slave circuit among the plurality of arbitration circuits. The control circuit may control the bus circuit so as to stop supply of the clock signal to the second arbitration circuit corresponding to the designated unused circuits. Thereby, it is possible to stop the clock to an arbitration circuit that arbitrates a request or a response to the unused circuit. Then, it is possible to reduce the dynamic power consumption.

It is preferable that the configuration information is information based on the use state when specific software is executed. Thereby, it is possible to optimize the bus circuit by causing the bus circuit to correspond to communication between specific circuits for each software.

Further, it is preferable that the configuration information is information derived based on operation information acquired when the specific software is executed in another semiconductor device mounted with at least the same configuration as that of the plurality of circuits and the bus circuit. In this way, it is possible to optimize the bus circuit in a more realistic operation by using operation information obtained by emulation of specific software.

Subsequently, a specific application example of the semiconductor device 1000 described above will be described below.

Figure 2:
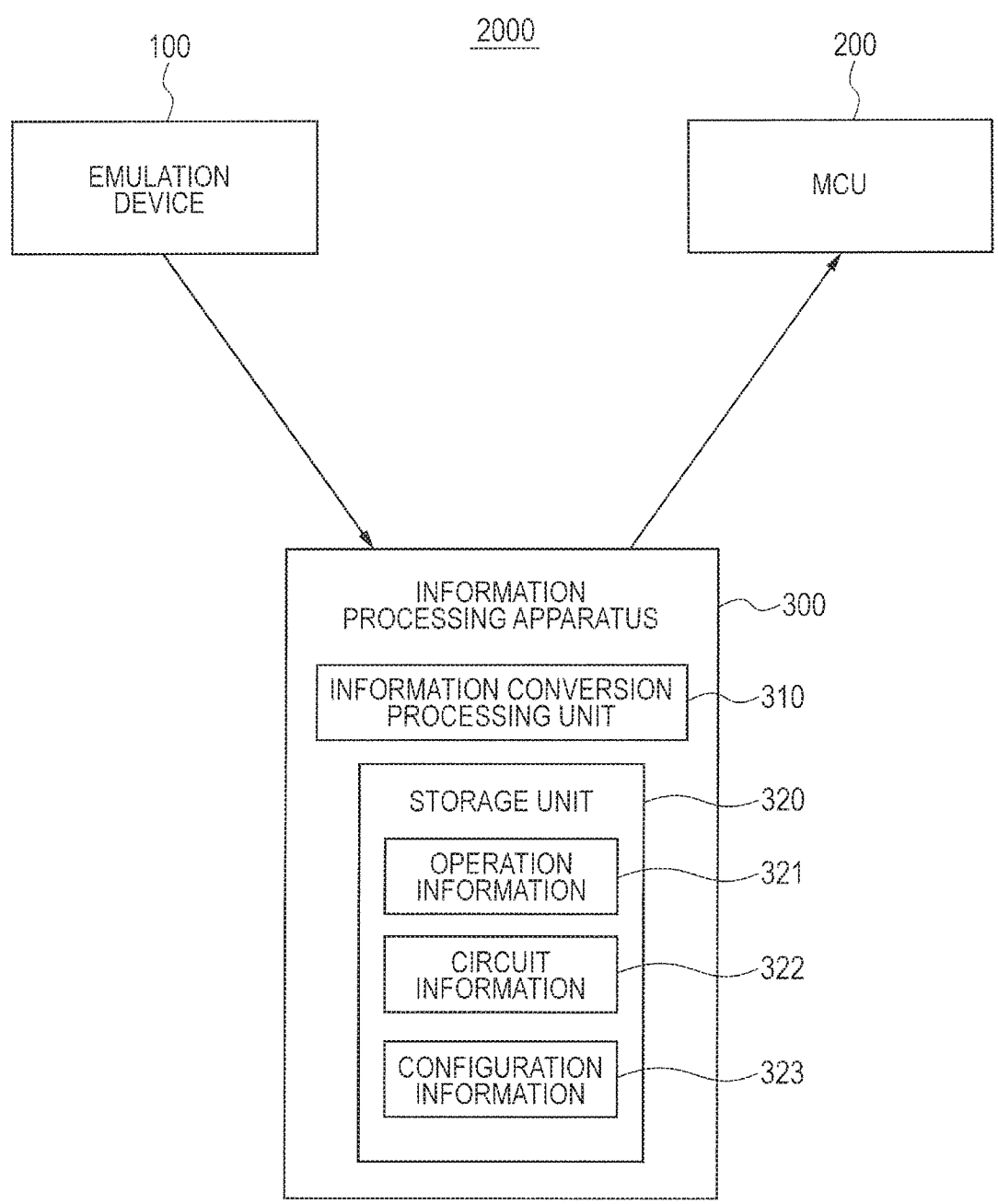
FIG. 2 is a block diagram showing a configuration of a reconfiguration control system of the semiconductor device according to the first embodiment.

FIG. 2 is a block diagram showing a configuration of a reconfiguration control system 2000 of the semiconductor device according to the first embodiment. The reconfiguration control system 2000 includes an emulation device 100, an MCU (Micro Control Unit) 200, and an information processing device 300. The MCU 200 is a working example of the semiconductor device 1000 described above and executes specific software. The MCU 200 corresponds to, for example, a semiconductor device for mass production. The emulation device 100 is a semiconductor device for emulating specific software mounted on the MCU 200 and advancing development of the software. Here, the emulation device 100 and the MCU 200 have many common circuits as described later. However, the emulation device 100 has an operation monitor described later as compared with the MCU 200. On the other hand, the MCU 200 has a reconfiguration control circuit described later as compared with the emulation device 100.

Figure 3:
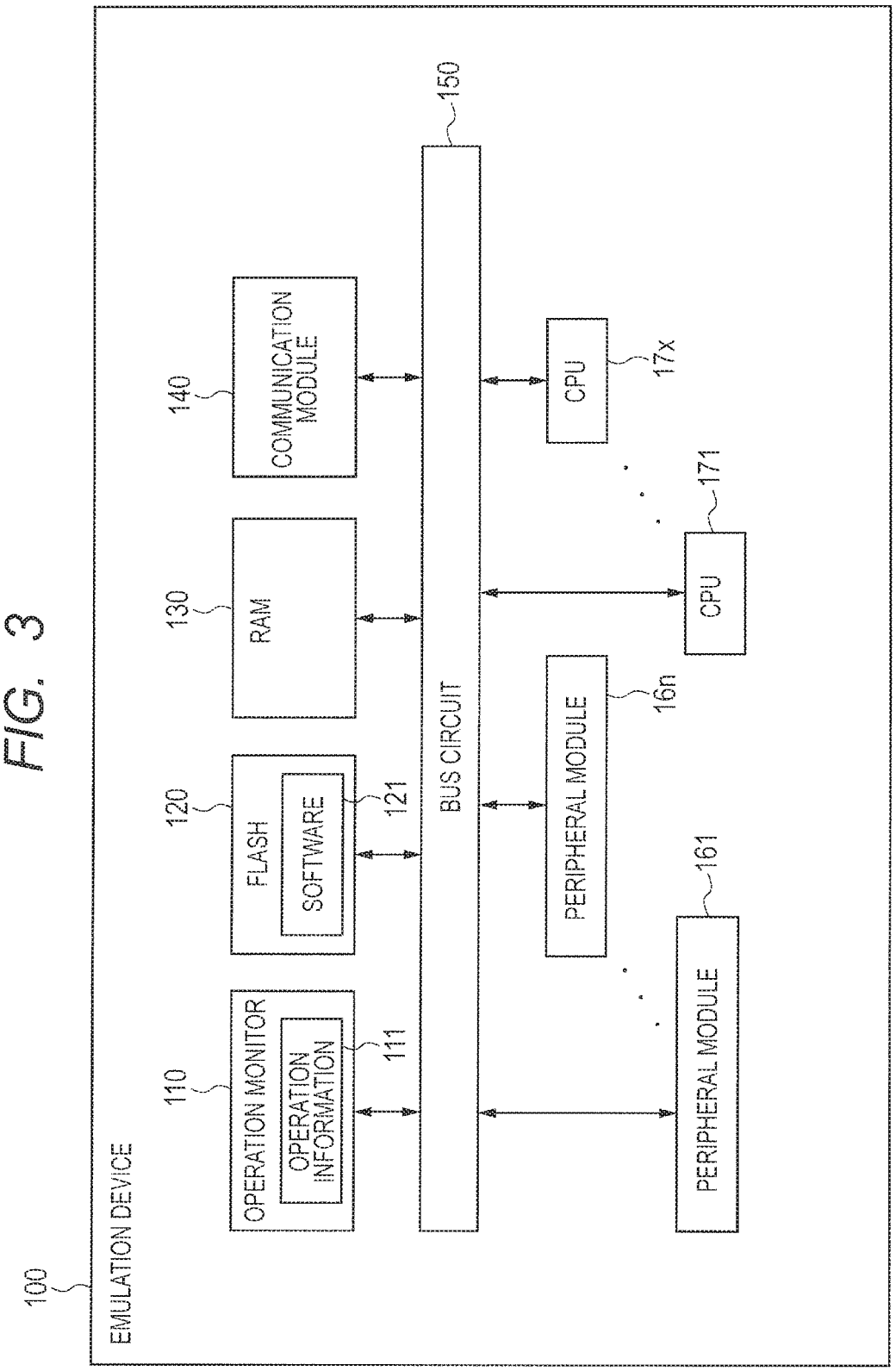
FIG. 3 is a block diagram showing a configuration of an emulation device according to the first embodiment.

FIG. 3 is a block diagram showing a configuration of the emulation device 100 according to the first embodiment. The emulation device 100 includes an operation monitor 110, a FLASH 120, a RAM 130, a communication module 140, a bus circuit 150, peripheral modules 161 to 16*n*, and CPUs 171 to 17*x* (x is a natural number greater than or equal to 2). The FLASH 120 is a flash memory which is an example of a non-volatile storage device that stores software 121 to be developed which is scheduled to be mounted on the MCU 200. The RAM 130 is a volatile storage device that temporarily stores various data. The communication module 140 is a circuit that communicates with outside. The bus circuit 150 is a signal path which couples the operation monitor 110, the FLASH 120, the RAM 130, the communication module 140, the peripheral modules 161 to 16*n*, and the CPUs 171 to 17*x*, and relays communication data between them. The bus circuit 150 has a plurality of buffers that temporarily store communication data as described later. The peripheral modules 161 to 16*n* are circuit blocks that perform various processing. At least one of the CPUs 171 to 17*x* realizes predetermined processing by reading the software 121 from the FLASH and executing the software 121.

The operation monitor 110 observes an operation state of each circuit when the software 121 is executed, acquires operation information 111, and stores the operation information 111 inside the operation monitor 110. In particular, the operation monitor 110 monitors communication between circuits when the software 121 is executed and acquires the operation information 111 from an operation of the bus circuit 150 during the communication. After the software 121 is executed, the operation monitor 110 transmits the operation information 111 to the information processing device 300 through the communication module 140. The operation information 111 includes, for example, bus routing information, a maximum number of used buffer entries, and the like. The bus routing information is information indicating a combination of a master circuit and a slave circuit when a request signal is transmitted from the master circuit, which is a transmission source, to the slave circuit, which is a transmission destination, through the bus circuit 150. The maximum number of used buffer entries is information indicating the maximum number of buffer entries when the buffers in the bus circuit 150 are used at the same time through execution of the software 121.

Let us return to FIG. 2. The information processing device 300 operates as a conversion tool that converts the operation information received from the emulation device 100 into configuration information for reconfiguring the MCU 200. The information processing device 300 includes an information conversion processing unit 310 and a storage unit 320. The information processing device 300 is a general purpose computer, so that a general configuration thereof is not shown in the drawings and a description of its operation will be omitted. The storage unit 320 is a non-volatile or volatile storage device. The storage unit 320 stores operation information 321, circuit information 322, and configuration information 323. The operation information 321 is information where the operation information 111 described above is stored. The circuit information 322 is information indicating a circuit configuration in the MCU 200. For example, the circuit information 322 is a list of the master circuits, a list of the slave circuits, and a total number of buffers in the bus circuit. The configuration information 323 is information for reconfiguring the bus circuit in the MCU 200.

When the information conversion processing unit 310 receives the operation information 111 from the emulation device 100, the information conversion processing unit 310 stores the operation information 111 into the storage unit 320 as the operation information 321. Further, the information conversion processing unit 310 performs a predetermined conversion based on the operation information 321 and the circuit information 322, generates the configuration information 323, and stores the configuration information 323 in the storage unit 320. After the conversion, the information conversion processing unit 310 transmits the configuration information 323 to the MCU 200.

Figure 4:
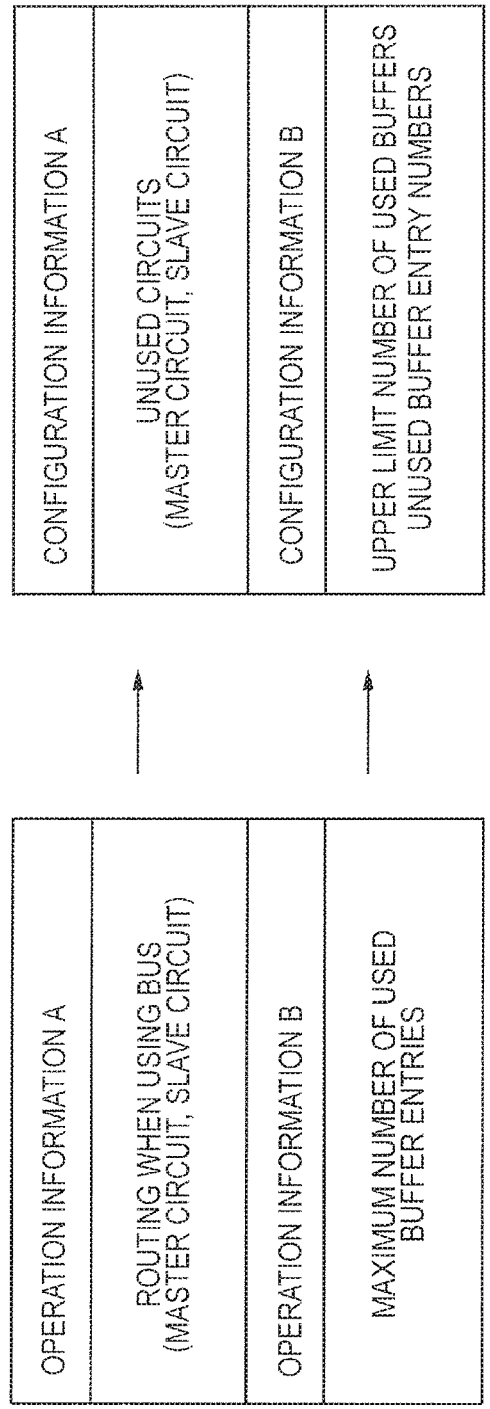
FIG. 4 is a diagram showing a relationship between operation information and configuration information according to the first embodiment.

FIG. 4 is a diagram showing a relationship between the operation information and the configuration information according to the first embodiment. For example, when operation information A is routing information when the bus circuit is used, the information conversion processing unit 310 identifies master circuits and slave circuits that do not appear in the operation information A from among the lists of the master circuits and the slave circuits of the circuit information 322 as unused circuits and defines the unused circuits as configuration information A. When operation information B is the maximum number of used buffer entries, the information conversion processing unit 310 defines the maximum number of used buffer entries as an upper limit number of used buffers. Further, the information conversion processing unit 310 calculates a number of unused entries by subtracting a maximum number of used entries from a total number of buffers in the circuit information 322. Then, the information conversion processing unit 310 defines each number corresponding to the number of unused entries from the maximum value of buffer entry number as an unused buffer entry number. The information conversion processing unit 310 defines the upper limit number of used buffers and the unused buffer entry numbers as configuration information B. Alternatively, the information conversion processing unit 310 may define information indicating "used" or "unused" for each buffer entry as the configuration information B. In this case, the information conversion processing unit 310 defines buffer entries corresponding to numbers smaller than the maximum number of used entries as "used" and defines buffer entries corresponding to numbers greater than or equal to the maximum number of used entries as "unused". Examples of the operation information and the configuration information are not limited to these.

Figure 5:
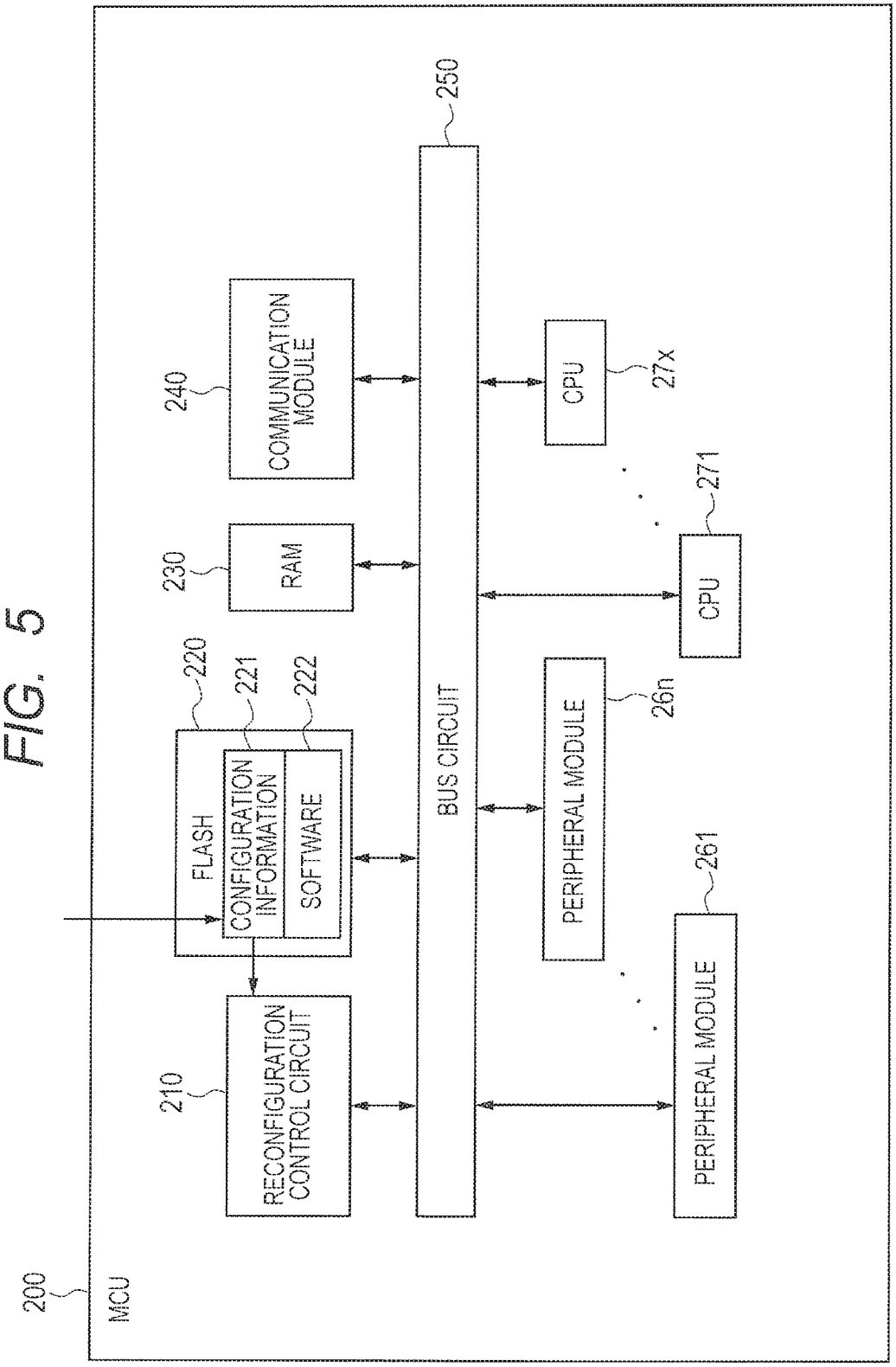
FIG. 5 is a block diagram showing a configuration of an MCU according to the first embodiment.

FIG. 5 is a block diagram showing a configuration of the MCU 200 according to the first embodiment. The MCU 200 includes a reconfiguration control circuit 210, a FLASH 220, a RAM 230, a communication module 240, a bus circuit 250, peripheral modules 261 to 26n, and CPUs 271 to 27x. The FLASH 220, the RAM 230, the communication module 240, the bus circuit 250, the peripheral modules 261 to 26n, and the CPUs 271 to 27x have the same configurations as those of the FLASH 120, the RAM 130, the communication module 140, the bus circuit 150, the peripheral modules 161 to 16n, and the CPUs 171 to 17x.

The FLASH 220 stores configuration information 221 received from the information processing device 300. Further, the FLASH 220 stores software 222 having the same function as that of the software 121 described above. The RAM 230 is a volatile storage device that temporarily stores various data. The reconfiguration control circuit 210 reads the configuration information 221 from the FLASH 220 when the MCU 200 starts up. Then, the reconfiguration control circuit 210 issues an instruction to a configuration in the bus circuit 250 based on the read configuration information 221.

Figure 6:
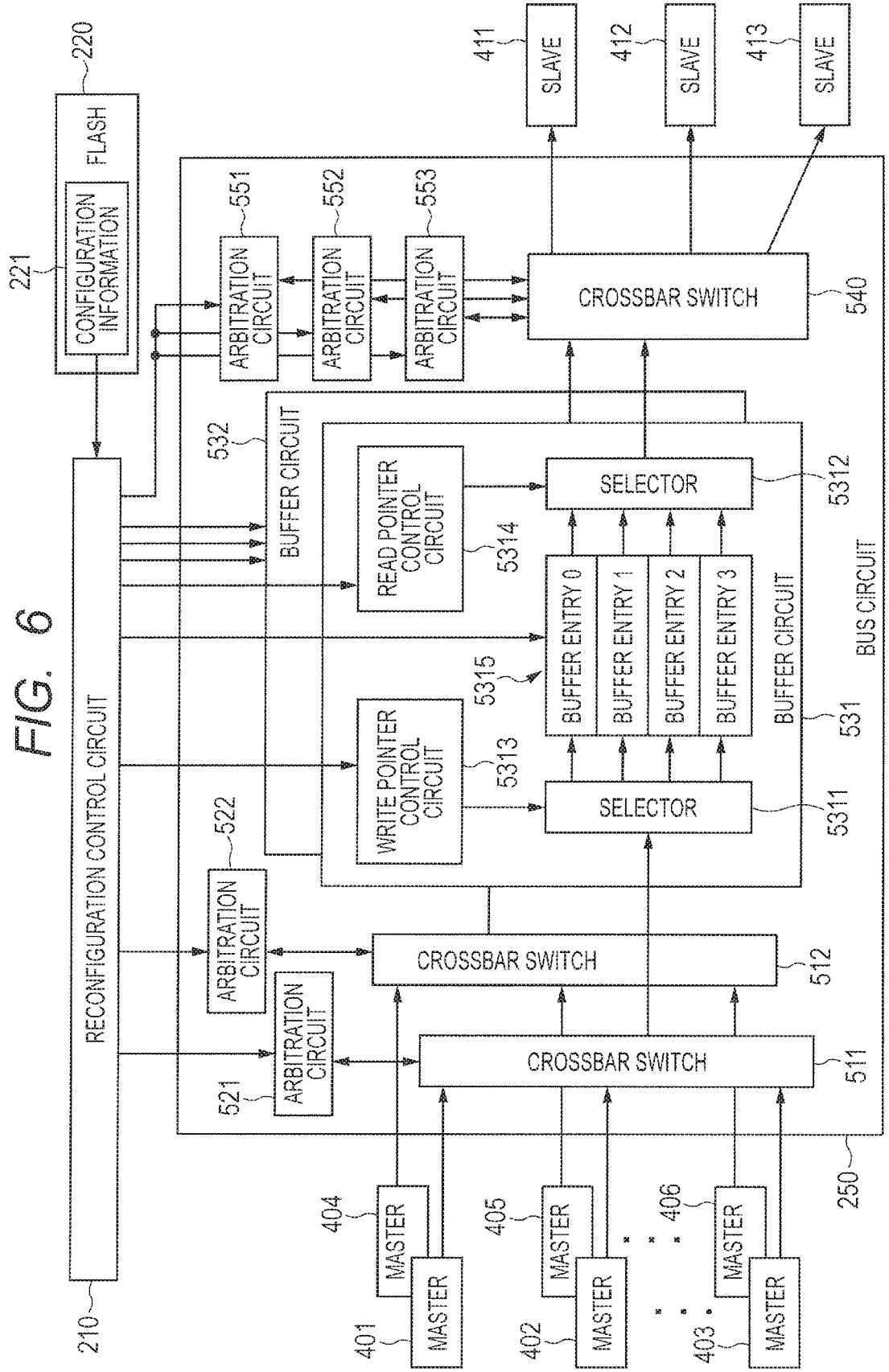
FIG. 6 is a block diagram showing a configuration including a bus circuit according to the first embodiment.

FIG. 6 is a block diagram showing a configuration including the bus circuit 250 according to the first embodiment. Here, the masters 401 to 406 indicate a case where, when the software 222 is executed, all or some of a configuration corresponding to the communication module 240, the bus circuit 250, the peripheral modules 261 to 26n, and the CPUs 271 to 27x operates as master circuits. Here, for convenience of description, the masters 401 to 406 are divided into two groups which are the masters 401 to 403 and the masters 404 to 406. However, the number of the groups and the number of the master circuits in each group are not limited to these.

Further, the slaves 411 to 413 indicate a case where all or some of a configuration corresponding to the FLASH 220, the RAM 230, the communication module 240, the bus circuit 250, the peripheral modules 261 to 26n, and the CPUs 271 to 27x operates as slave circuits. Here, for convenience of description, the three slaves 411 to 413 are shown as one group. However, the number of the groups and the number of the slave circuits in each group are not limited to these. Based on the above, although the FLASH 220 may be included in the slave 411 or the like, the FLASH 220 is shown separately from the slaves in FIG. 6 for convenience of description.

FIG. 6 shows a configuration where communication data which is a request from a master circuit to a slave circuit is relayed in the bus circuit 250. Besides the above, the bus circuit 250 has a configuration where communication data which is a response from a slave circuit to a master circuit is relayed. However, the configuration corresponds to FIG. 6, so that the configuration is not shown in the drawings and the description of the configuration will be omitted.

The reconfiguration control circuit 210 issues various instructions to the bus circuit 250 based on the configuration information 221 read from the FLASH 220. At least a part of the masters 401 to 406 transmits a request for transmitting communication data to one of the slaves 411 to 413 through the bus circuit 250. Further, at least a part of the slaves 411 to 413 receives a request from one of the masters 401 to 406 through the bus circuit 250.

The bus circuit 250 has crossbar switches 511 and 512, arbitration circuits 521 and 522, buffer circuits 531 and 532, a crossbar switch 540, and arbitration circuits 551 to 553. The crossbar switch 511 receives communication data including transmission destination information from the masters 401 to 403, and outputs a request signal indicating a list of masters from which the communication data is received at the same time to the arbitration circuit 521. Further, the crossbar switch 511 receives an arbitration result from the arbitration circuit 521, and outputs communication data from a master designated by the arbitrate result to the buffer circuit 531. Similarly, the crossbar switch 512 receives communication data including transmission destination information from the masters 404 to 406, and outputs a request signal to the arbitration circuit 522. Further, the crossbar switch 512 receives an arbitration result from the arbitration circuit 522, and outputs communication data from a master designated by the arbitrate result to the buffer circuit 532.

The arbitration circuit 521 receives active signals A0 to An indicating designation of unused circuits from among the masters 401 to 403 from the reconfiguration control circuit 210, and stops supply of a clock signal to flipflops (FF) corresponding to the masters 401 to 403. Further, the arbitration circuit 521 arbitrates masters based on the request signal from the crossbar switch 511 and an arbitration selection signal, and outputs an arbitration result signal that designates the arbitrated masters to the crossbar switch 511.

Figure 7:
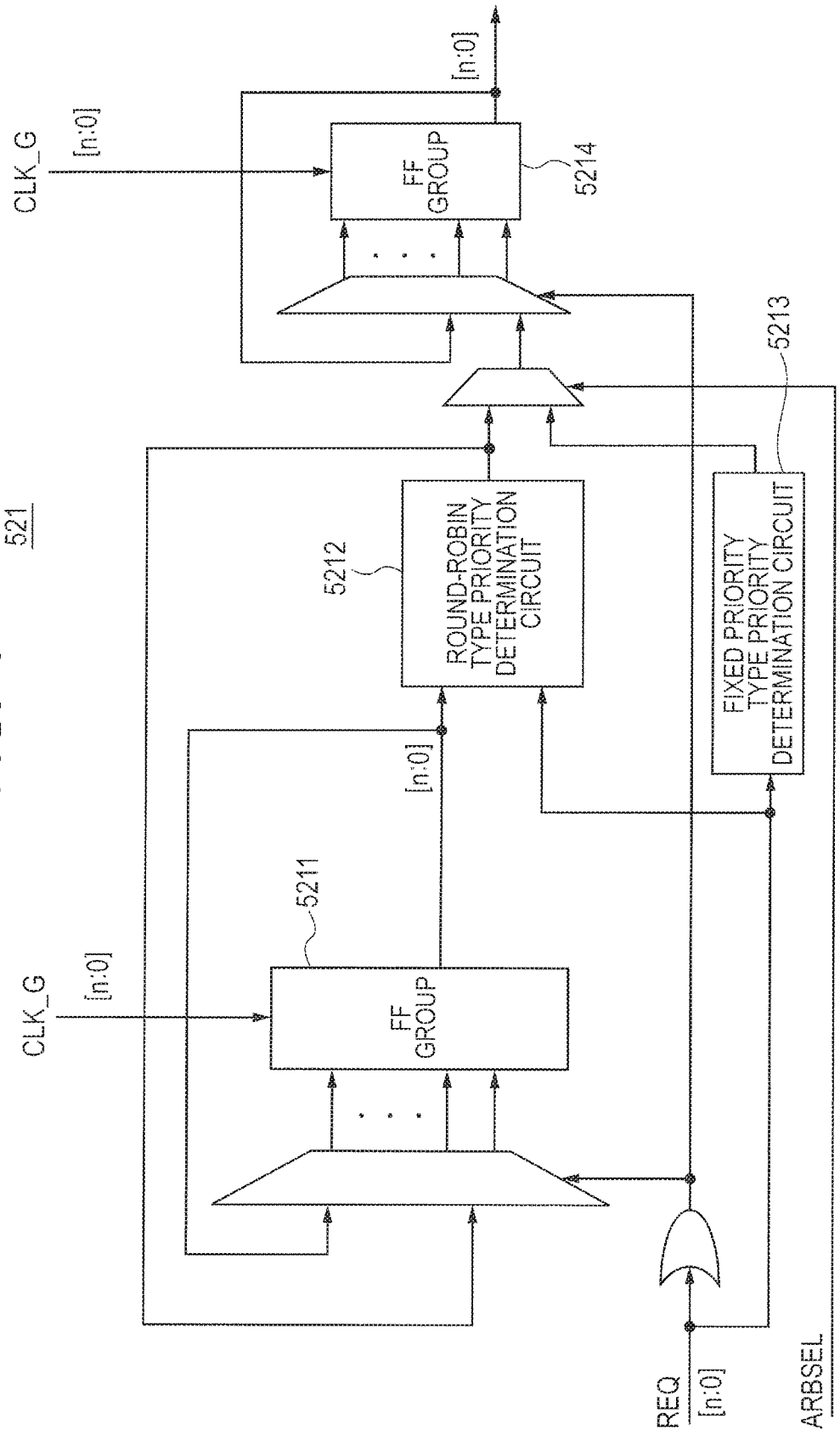
FIG. 7 is a block diagram showing a configuration of an arbitration circuit according to the first embodiment.

FIG. 7 is a block diagram showing a configuration of the arbitration circuit 521 according to the first embodiment. A configuration and an operation of the arbitration circuit 521 are the same as those of the arbitration circuit 521, so that drawing and description of the arbitration circuit 521 are omitted. Here, it is assumed that the number of the masters 401 to 403 is n+1.

The arbitration circuit 521 includes an FF group 5211, a round-robin type priority determination circuit 5212, a fixed priority type priority determination circuit 5213, and an F group 5214. The round-robin type priority determination circuit 5212 and the fixed priority type priority determination circuit 5213 can be realized by a known technique. The arbitration circuit 521 receives a request signal REQ of n+1 bits and an arbitration selection signal ARBSEL. Then, one of the round-robin type priority determination circuit 5212 and the fixed priority type priority determination circuit 5213 is selected according to the arbitration selection signal ARBSEL, and a signal value selected from the request signal REQ by the one of the priority determination circuits because the priority of the signal value is high is outputted as an arbitration result. At this time, the FF group 5211 performs arbitration by a round-robin method, so that the FF group 5211 holds information of a request signal selected last by the round-robin method. The FF group 5214 holds information of a finally selected request signal. Here, each of the FF group 5211 and the FF group 5214 has n+1 FFs, that is, FFs corresponding to the masters 401 to 403. Each FF in the FF group 5211 and the FF group 5214 operates according to a clock signal CLK_G.

Figure 8:
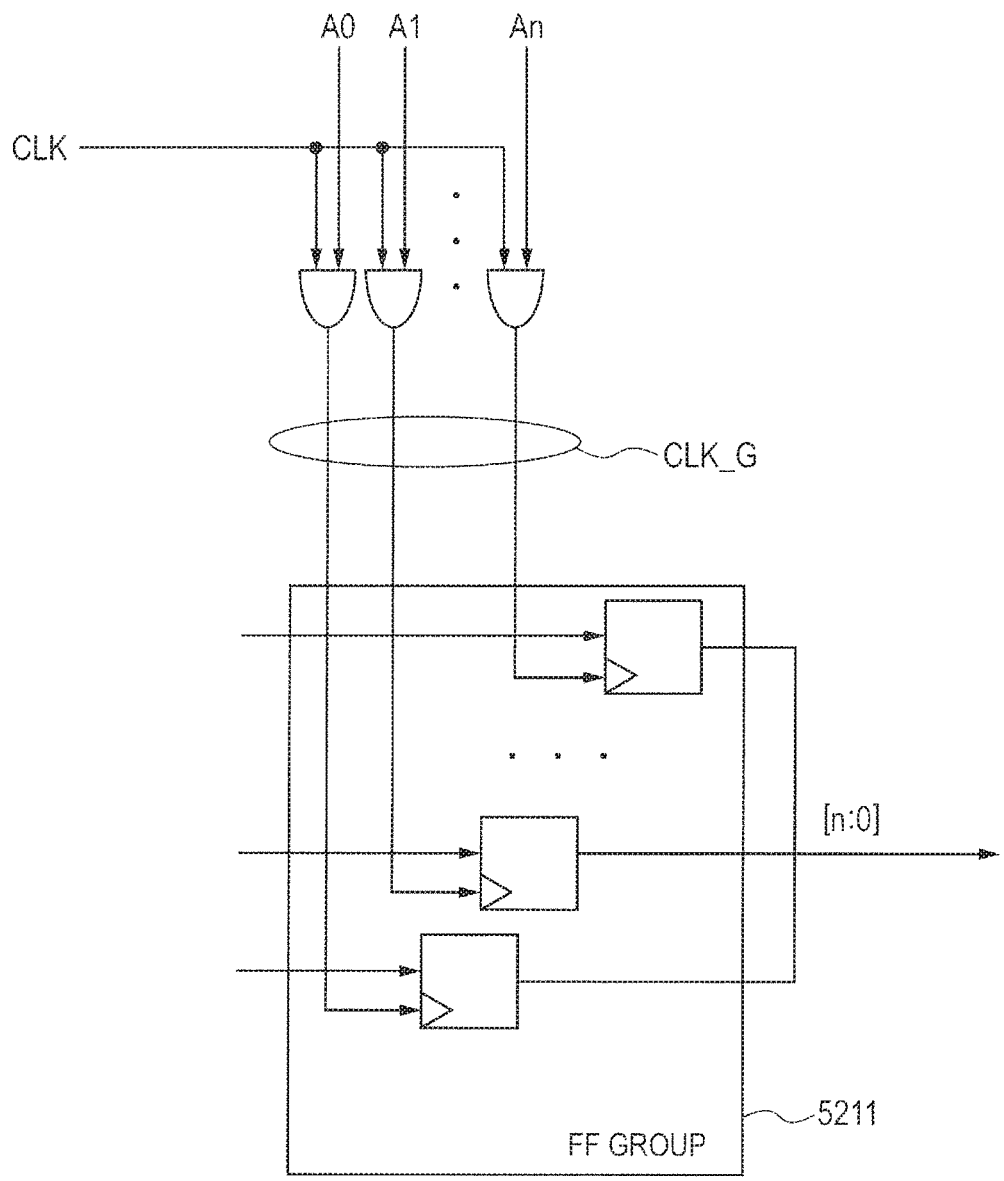
FIG. 8 is a block diagram showing a configuration of an FF group in the arbitration circuit according to the first embodiment.

Here, FIG. 8 is a block diagram showing a configuration of the FF group 5211 in the arbitration circuit 521 according to the first embodiment. A configuration and an operation of the FF group 5214 are the same as those of the FF group 5211, so that drawing and description of the FF group 5214 are omitted. Each FF in the FF group 5211 is coupled with a corresponding AND circuit. Each AND circuit outputs a logical AND of the active signal A0, A1, . . . , or An and the clock signal CLK as the clock signal CLK_G. For example, the reconfiguration control circuit 210 sets active signals corresponding to master circuits designated as unused circuits in the configuration information 221 to 0, and sets active signals corresponding to the other master circuits (used master circuits) to 1. Therefore, FFs corresponding to unused circuits in the FFs in the FF group 5211 are inactivated by the clock signal CLK_G, so that power consumption is suppressed. Then, the value of the request signal of the inactivated FFs becomes 0, and the round-robin type priority determination circuit 5212 cannot select master circuits corresponding to the inactivated FFs. Here, the master circuits corresponding to the inactivated FFs are not used as master circuits when the software 222 is executed, so that even when the master circuits are not arbitrated, there is no influence. Further, the request signal corresponding to the inactivated FFs is 0 at all times, so that corresponding FFs in a post-stage FF group 5214 may also be inactivated.

Let us return to FIG. 6. The buffer circuit 531 includes selectors 5311 and 5312, a write pointer control circuit 5313, a read pointer control circuit 5314, and a buffer group 5315. A configuration and an operation of the buffer circuit 532 are the same as those of the buffer circuit 531, so that drawing and description of the buffer circuit 532 are omitted.

The selector 5311 receives communication data from the crossbar switch 511, and receives designation of a storage destination buffer from the write pointer control circuit 5313. Then, the selector 5311 outputs the communication data to a designated buffer in the buffer group 5315.

The buffer group 5315 has a plurality of buffer entries. Here, the buffer group 5315 has four buffer entries. However, the number of the buffer entries may be two or more. Each buffer entry temporarily stores communication data from the selector 5311. Further, each buffer entry outputs communication data according to reading from the selector 5312. However, the buffer circuit 531 receives the active signals A0 to A3 indicating designation of unused buffers from among the buffers 0 to 3 in the buffer group 5315 from the reconfiguration control circuit 210, and stops supply of a clock signal to the buffers designated by the active signals.

The selector 5312 receives designation of a read source buffer from the read pointer control circuit 5314. Then, the selector 5312 reads communication data from the designated read source buffer in the buffer group 5315, and outputs the communication data to the crossbar switch 540.

The write pointer control circuit 5313 receives a signal indicating the upper limit number of used buffers from the reconfiguration control circuit 210, selects an entry number smaller than the upper limit number of used buffers, and outputs the entry number to the selector 5311 as a designation of the storage destination buffer. The read pointer control circuit 5314 receives a signal indicating the upper limit number of used buffers from the reconfiguration control circuit 210, selects an entry number smaller than the upper limit number of used buffers, and outputs the entry number to the selector 5312 as a designation of the read source buffer.

Figure 9:
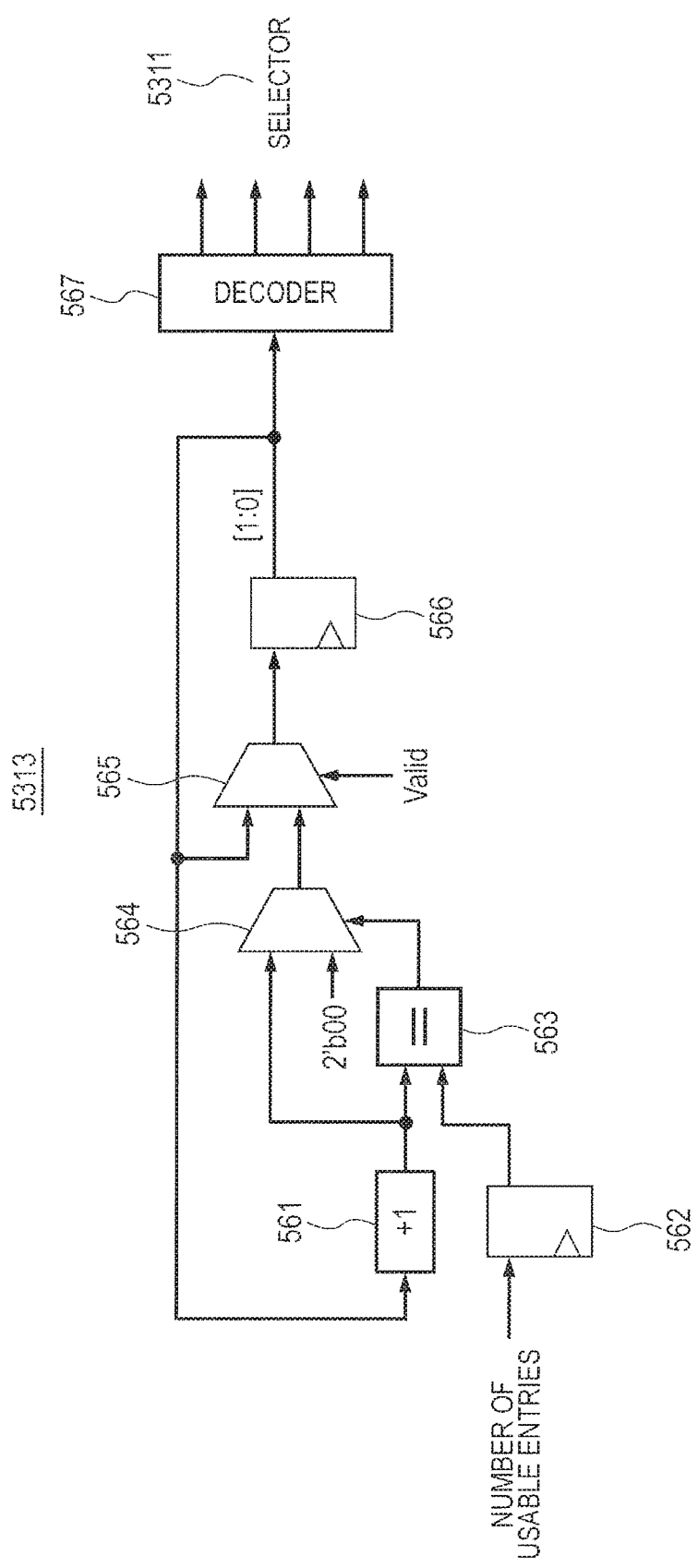
FIG. 9 is a block diagram showing a configuration of a pointer circuit according to the first embodiment.

FIG. 9 is a block diagram showing a configuration of the write pointer control circuit 5313 according to the first embodiment. A configuration and an operation of the read pointer control circuit 5314 correspond to those of the write pointer control circuit 5313, so that drawing and description of the read pointer control circuit 5314 are omitted.

The write pointer control circuit 5313 includes an adder 561, an FF 562, a comparator 563, a selector 564, a selector 565, an FF 566, and a decoder 567. A Valid signal indicates a write request effective signal. In the case of the read pointer control circuit 5314, the Valid signal indicates a read completion signal. When the Valid signal is 0, the selector 565 selects an entry number (pointer) selected previous time and outputs the entry number to the FF 566. The FF 566 holds the selected pointer. The decoder 567 decodes the pointer, sets a signal corresponding to the pointer among the buffer 0 to 3 to 0, sets the other signals to 1, and outputs the signals to the selector 5311. The adder 561 adds 1 to the pointer held by the FF 566. The FF 562 holds a signal indicating the upper limit number of used buffers received from the reconfiguration control circuit 210, that is, the number of usable entries. The comparator 563 compares a pointer of a result of addition performed by the adder 561 with the number of usable entries held by the FF 562, and when the pointer and the number of usable entries correspond to each other, the comparator 563 outputs 1 to the selector 564 as a selection signal. When the selection signal is 0, the selector 564 selects the pointer which is the result of addition performed by the adder 561, and when the selection signal is 1, the selector 564 selects 2b' 00 which is an initial value of the pointer and outputs the 2b' 00 to the selector 565. For example, if the number of usable entries is 2b' 10, when the pointer becomes 2b' 10 after being added to become 2b'00 and then to become 2b'01 by the adder 561, the selector selects 2b'00.

In this way, the write pointer control circuit 5313 increments the pointer every time 1 of the Valid signal is notified. When the incremented pointer corresponds to the number of usable entries, the pointer is initialized to 0. Therefore, the write pointer control circuit 5313 outputs a pointer whose value is smaller than the number of usable entries at all times. Thus, inactivated buffers are not selected by the selector 5311, so that it is possible to prevent malfunction.

When the number of usable entries is half of a total number of buffers in the buffer group 5315, in FIG. 9, the upper bit of the pointer of the result of addition performed by the adder 561 may be masked to O. Thereby, the write pointer control circuit 5313 can be more simplified than the configuration of FIG. 9.

Figure 10:
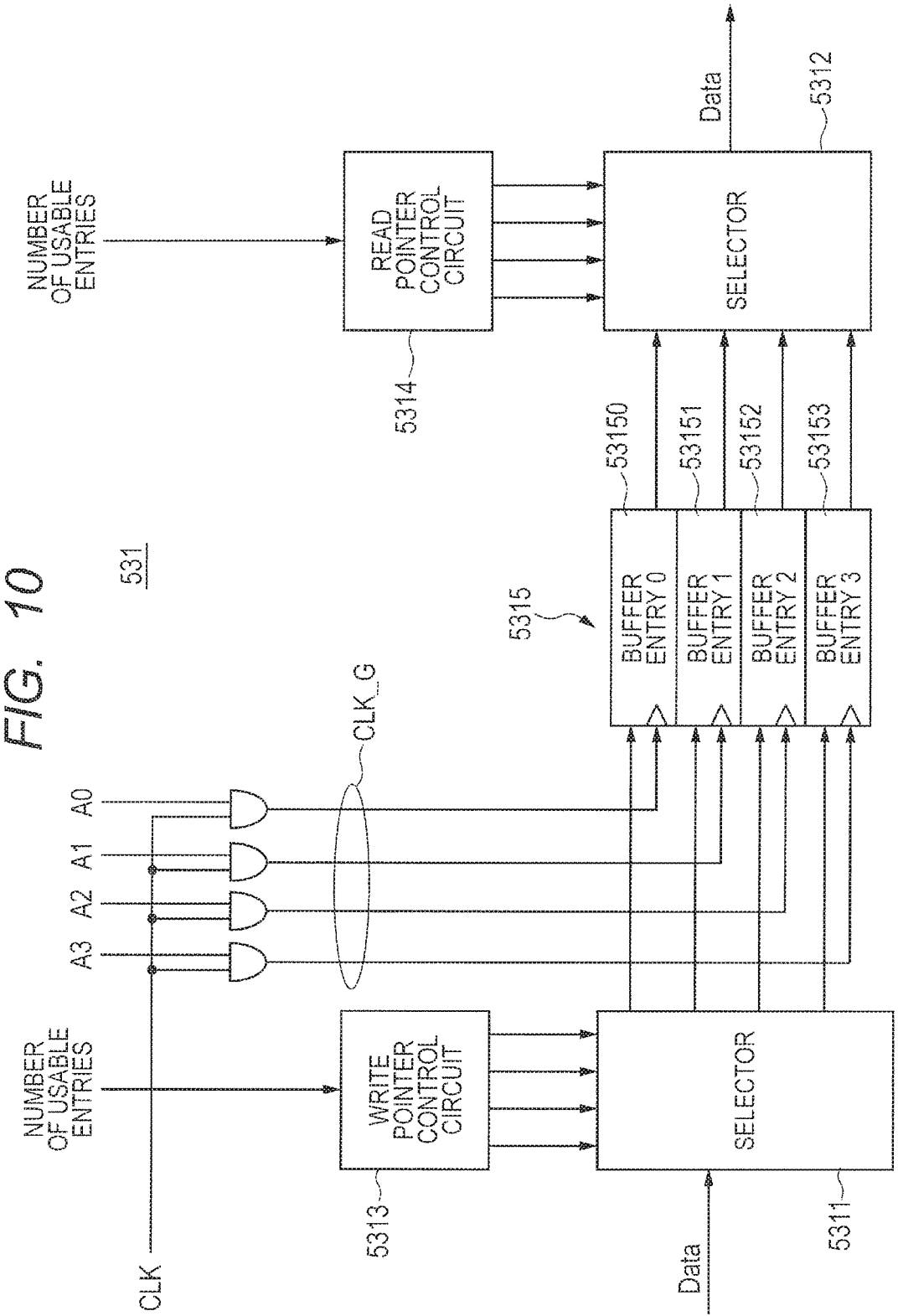
FIG. 10 is a block diagram showing a configuration of a buffer circuit according to the first embodiment.

FIG. 10 is a block diagram showing a configuration of the buffer circuit 531 according to the first embodiment. First, as described above, when the MCU 200 starts up, the write pointer control circuit 5313 and the read pointer control circuit 5314 receive a signal indicating the number of usable entries from the reconfiguration control circuit 210. In response to this, the write pointer control circuit 5313 and the read pointer control circuit 5314 output a corresponding pointer to the selectors 5311 and 5312.

The buffer group 5315 has a buffer 0_53150, a buffer 1_53151, a buffer 2_53152, and a buffer 3_53153. Corresponding AND circuits are coupled to the buffers 0_53150 to 3_53153. Each AND circuit outputs a logical AND of an active signal A0, A1, A2, or A3 and the clock signal CLK as the clock signal CLK_G. For example, the reconfiguration control circuit 210 sets active signals corresponding to entry numbers designated as unused buffers in the configuration information 221 to 0, and sets active signals corresponding to the other buffers (used buffers) to 1. Therefore, unused buffers of the buffers in the buffer group 5315 are inactivated by the clock signal CLK_G, so that power consumption is suppressed. Here, the inactivated buffers are buffers that are not used when the software 222 is executed, so that there is no influence on the execution.

Let us return to FIG. 6. The arbitration circuits 551 to 553 correspond to the slave 411 to 413, respectively. The crossbar switch 540 receives communication data from the buffer circuits 531 and 532 and outputs a request signal indicating a list of buffer circuits that receive communication data at the same time to the arbitration circuits 551 to 553 corresponding to transmission destination slaves. The crossbar switch 540 receives an arbitration result from one of the arbitration circuits 551 to 553, and outputs communication data from a buffer circuit designated by the arbitration result to one of the slaves 411 to 413, which is the transmission destination.

The arbitration circuit 551 receives an active signal indicating designation of unused circuit of the corresponding slave 411 from the reconfiguration control circuit 210, and when the active signal indicates inactive, that is, when the slave 411 is an unused circuit, supply of the clock signal to the arbitration circuit 551 corresponding to the slave 411 is stopped, so that power consumption is suppressed. The same goes for the arbitration circuits 552 and 553. Here, the slave circuit that is designated as an unused circuit is not used as a slave circuit when the software 222 is executed, so that it is not necessary for the arbitration circuit corresponding to the slave circuit that is designated as an unused circuit to perform arbitration. The slave circuit does not become a transmission destination of communication data received by the crossbar switch 540, so that the crossbar switch 540 does not output the request signal to the arbitration circuit corresponding to the slave circuit that is designated as an unused circuit. Therefore, no problem occurs when the software 222 is executed.

Subsequently, a reconfiguration control method of the semiconductor device according to the present embodiment will be described. The semiconductor device includes at least a plurality of circuits, a bus circuit including a plurality of buffers that temporarily store communication data between the plurality of circuits and a plurality of arbitration circuits that arbitrate an access between the plurality of circuits and the plurality of buffers, a storage unit that stores information based on a use state of the plurality of buffers during communication between the plurality of circuits and configuration information including designation of unused circuits that are not used for the communication from among the plurality of circuits, and a control circuit. In the reconfiguration control method, at least the control circuit of the semiconductor device reads configuration information from the storage unit and controls the bus circuit having the plurality of buffers so as to stop use of unused buffers that are not used for the communication from among the plurality of buffers and at least a partial configuration in arbitration circuits corresponding to the unused circuits from among the plurality of arbitration circuits based on the configuration information.

Further, It is desirable that an operation described below is performed in the reconfiguration control method. In another semiconductor device mounted with at least the same configuration as that of the plurality of circuits and the bus circuit, when specific software is executed, operation information related to the communication between the plurality of circuits is acquired. Then, the configuration information is derived based on the operation information. Then, the configuration information is stored in the storage unit. Thereafter, the configuration information is read from the storage unit when the specific software is executed in the semiconductor device.

Figure 11:
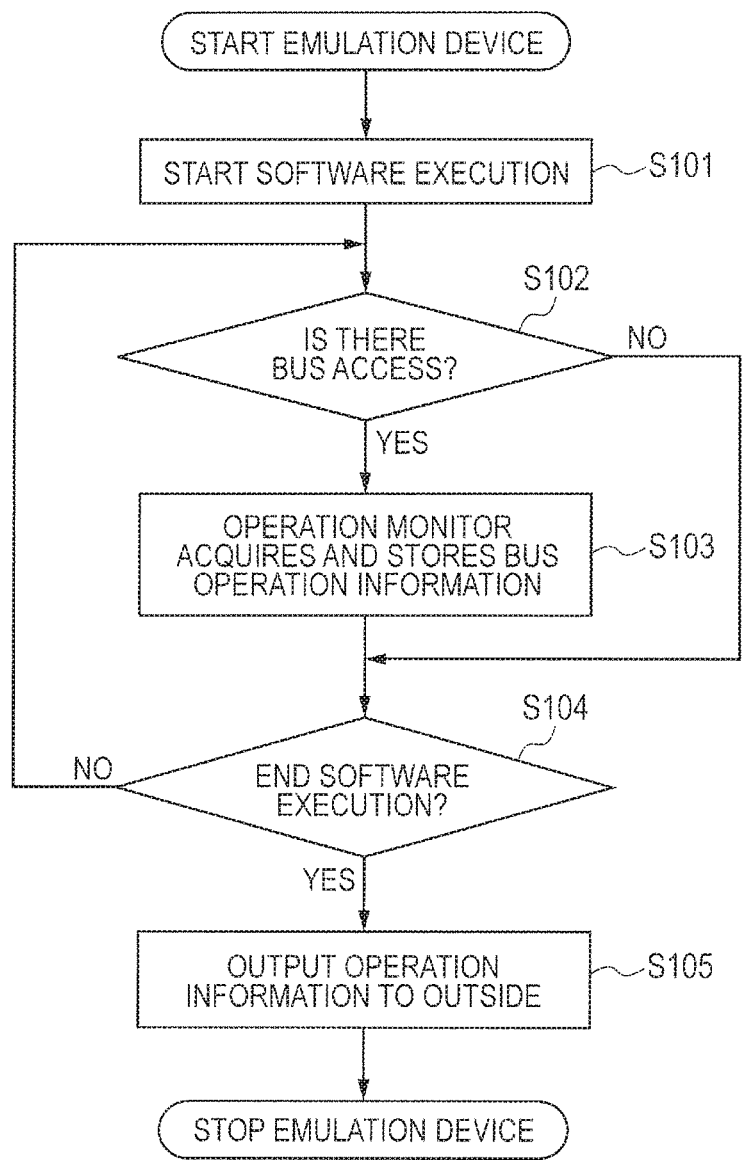
FIG. 11 is a flowchart showing flow of operation information acquisition processing according to the first embodiment.

Hereinafter, a specific working example of the reconfiguration control method of the semiconductor device according to the present embodiment will be described. FIG. 11 is a flowchart showing flow of operation information acquisition processing according to the first embodiment. First, the emulation device 100 starts up. Then, one of the CPUs 171 to 17x reads the software 121 to be developed from the FLASH 120 and executes the software 121 (S101). Then, the operation monitor 110 monitors access to the bus circuit 150 in each process while the software 121 is being executed. Then, the operation monitor 110 determines whether or not a bus access occurs (S102). When the bus access does not occur, the operation monitor 110 proceeds to step S104. On the other hand, when the bus access occurs, the operation monitor 110 acquires and stores the operation information 111 of the bus circuit 150 (S103). For example, the operation monitor 110 acquires bus routing information of the bus circuit 150 regarding an access from a master circuit to a slave circuit. Further, the operation monitor 110 acquires the number of used buffers in the bus circuit 150 during multiple accesses, and when the number of used buffers is the maximum value, the operation monitor 110 stores the number of used buffers as the maximum number of used buffer entries.

Thereafter, the emulation device 100 determines whether or not the execution of the software 121 is completed (S104). When the execution of the software 121 is not completed, the emulation device 100 returns to step S102. On the other hand, when the execution of the software 121 is completed, the operation monitor 110 outputs the operation information 111 to the information processing device 300 through the communication module 140 (S105). Then, the information processing device 300 receives the operation information 111 and stores the operation information 111 into the storage unit 320 as the operation information 321.

Figure 12:
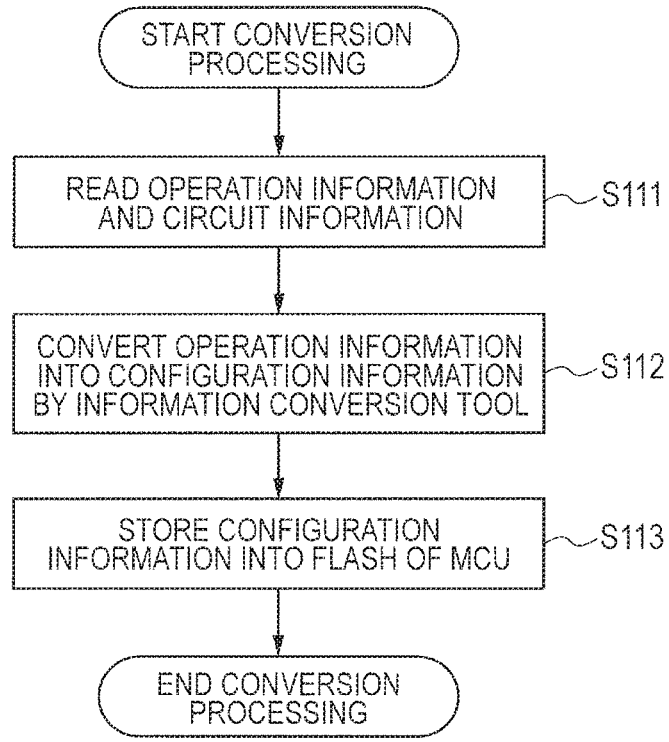
FIG. 12 is a flowchart showing flow of conversion processing according to the first embodiment.

Next, FIG. 12 is a flowchart showing flow of conversion processing according to the first embodiment. First, the information conversion processing unit 310 reads the operation information 321 and the circuit information 322 from the storage unit 320 (S111). Next, the information conversion processing unit 310 converts the operation information 321 into the configuration information 323 (S112). For example, the information conversion processing unit 310 converts the operation information 321 as shown in FIG. 4 described above. As a specific example of the operation information B, when the maximum number of used buffer entries is 2 (3b' 010), the information conversion processing unit 310 converts the operation information B into 6b' 100011. In this case, the upper two bits (2b' 10) are used as the upper limit number of used buffers, and the lower four bits (4b'0011) are used as active signals A3, A2, A1, and A0 corresponding to unused buffer entries. Thereafter, the information conversion processing unit 310 stores the converted configuration information 323 into the storage unit 32. Then, the information conversion processing unit 310 transmits the configuration information 323 to the MCU 200 and stores the configuration information 323 into the FLASH 220 in the MCU 200 (S113).

Figure 13:
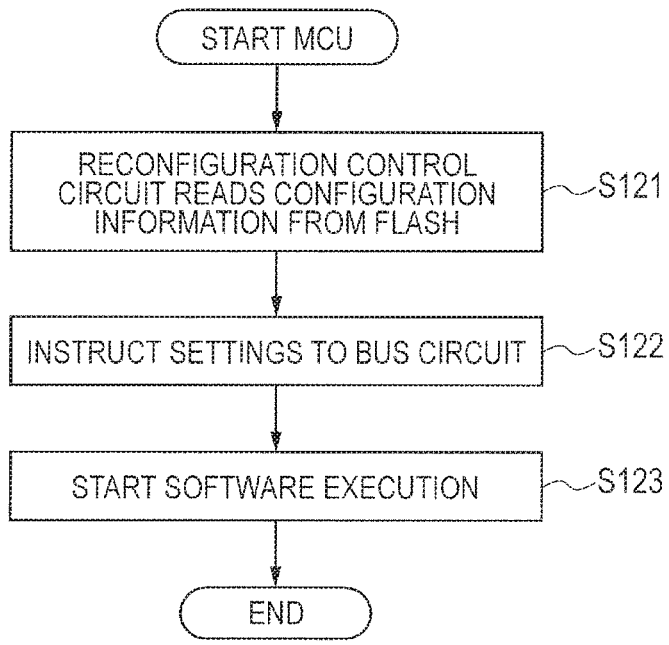
FIG. 13 is a flowchart showing flow of reconfiguration processing according to the first embodiment.

FIG. 13 is a flowchart showing flow of reconfiguration processing according to the first embodiment. First, the MCU 200 starts up. Then, the reconfiguration control circuit 210 reads the configuration information 221 from the FLASH 220 (S121). Next, the reconfiguration control circuit 210 issues various settings to the bus circuit 250 based on the configuration information 221 (S122). For example, as described above, the reconfiguration control circuit 210 sets an active signal corresponding to a master circuit and a slave circuit indicated by an unused circuit included in the configuration information 221 to 0, and outputs the active signal to the arbitration circuit 521 or the like. Further, the reconfiguration control circuit 210 outputs the upper limit number of used buffers included in the configuration information 221 to the write pointer control circuit 5313 and the read pointer control circuit 5314. Further, the reconfiguration control circuit 210 sets active signals corresponding to entry numbers of unused buffers included in the configuration information 221 to 0, sets active signals corresponding to entry numbers of buffers other than the unused buffers to 1, and outputs the active signals to the buffer group 5315. Thereby, the bus circuit 250 is reconfigured.

Thereafter, one of the CPUs 271 to 27x reads the software 222 from the FLASH 220 and executes the software 222. Thereby, the clock signal is supplied to a configuration of the bus circuit 250 that is used at minimum when the software 222 is executed, so that it is possible to suppress supply of the clock signal to an unused configuration. Therefore, it is possible to automatically realize an optimal circuit configuration corresponding to various software for the same MCU 200. In particular, the operation of the software 121 is observed by using the emulation device 100, so that it is possible to acquire information that is difficult to be obtained by only a software analysis or the like, and the circuit configuration can be brought close to an optimal configuration.

<Second Embodiment>

The second embodiment is an improved example of the first embodiment. Specifically, the configuration information includes interrupt notification by an interrupt controller included in the semiconductor device, a channel used by DMA (Direct Memory Access), or designation of unused circuits identified based on a port of a communication port, which are used when the specific software is executed. The control circuit controls the interrupt controller, the DMA, or the communication port so as to stop the supply of the clock signal to a configuration corresponding to the designated unused circuits when the specific software is executed. Thereby, it is possible to reduce power consumption of unused circuits for the interrupt controller, the DMA, or the communication port in addition to the bus circuit.

Figure 14:
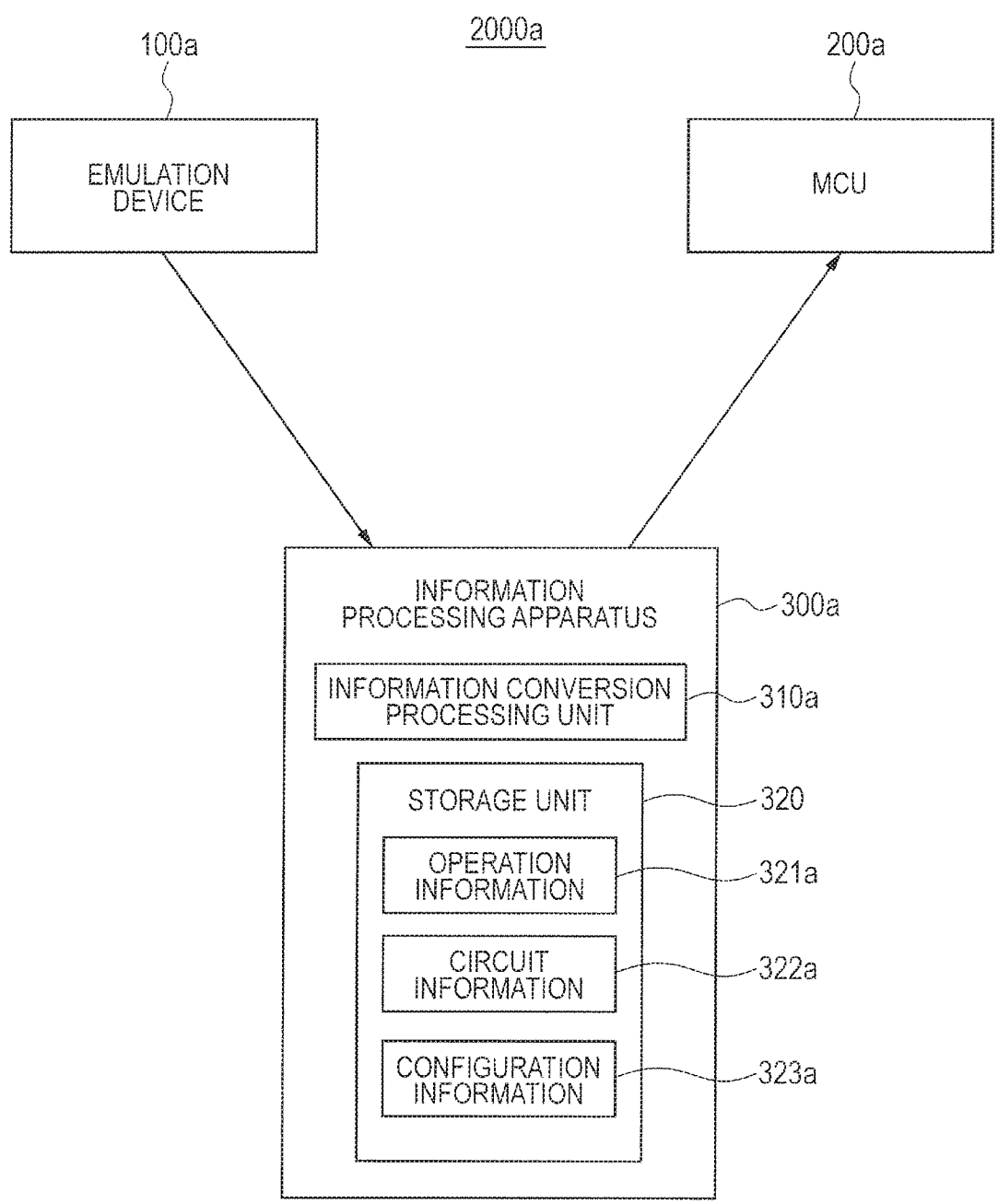
FIG. 14 is a block diagram showing a configuration of a reconfiguration control system of a semiconductor device according to a second embodiment.

FIG. 14 is a block diagram showing a configuration of a reconfiguration control system 2000a of the semiconductor device according to the second embodiment. The reconfiguration control system 2000a includes an emulation device 100a, an MCU 200a, and an information processing device 300a.

Figure 15:
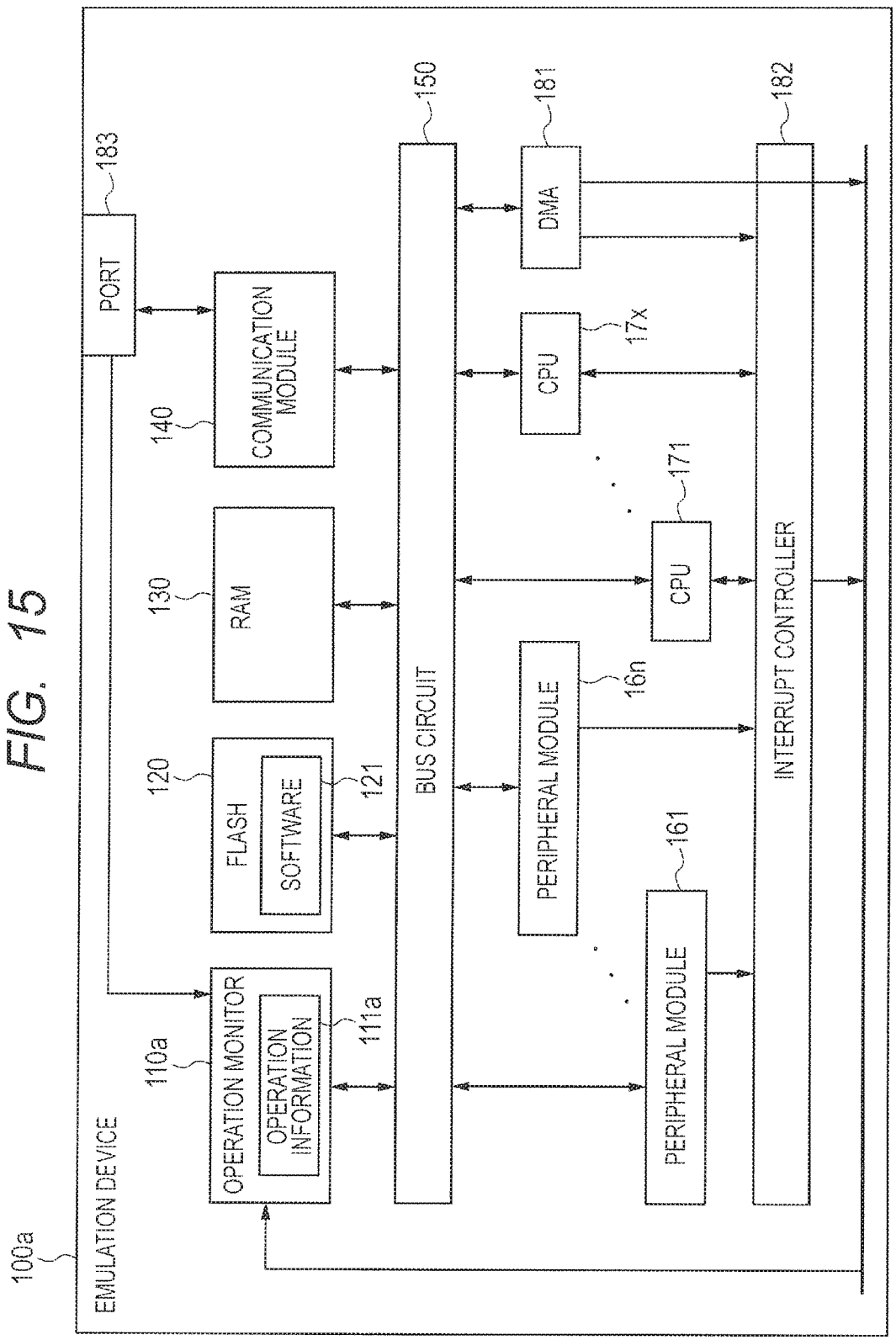
FIG. 15 is a block diagram showing a configuration of an emulation device according to the second embodiment.

FIG. 15 is a block diagram showing a configuration of the emulation device 100a according to the second embodiment. The emulation device 100a is a device obtained by improving the emulation device 100 described above. In the emulation device 100a, the operation monitor 110 is replaced by an operation monitor 110a, and a DMA 181, an interrupt controller 182, and a port 183 are added. The DMA 181 is a circuit that enables data transmission between modules without using the CPUs 171 to 17x. The interrupt controller 182 receives an interrupt request when the software 121 is executed and performs priority control, mask control, interrupt notification, and the like. The port 183 performs input/output control with outside.

The operation monitor 110a observes an operation state of each circuit when the software 121 is executed, acquires operation information 111a, and stores the operation information 111a inside the operation monitor 110a. In particular, the operation monitor 110a acquires a used DMA channel from an operation of the DMA 181 when the software 121 is executed. Further, the operation monitor 110a acquires an interrupt ID when an interrupt request is issued from the interrupt controller 182. Further, the operation monitor 110a acquires a used port number in a port path used during input/output with outside. In other words, the operation monitor 110a adds at least one of the used DMA channel, the interrupt ID, and the used port number to the operation information 111 described above and stores the operation information 111 as operation information 111a.

The information processing device 300a is a device obtained by improving the information processing device 300 described above. The information processing device 300a includes an information conversion processing unit 310a and a storage unit 320. The storage unit 320 stores operation information 321a, circuit information 322a, and configuration information 323a. The operation information 321a is information where the operation information 111a described above is stored. The circuit information 322a includes a configuration of a DMA 281 included in the MCU 200a, an interrupt controller 282, and a port 283 in addition to the circuit information 322. The configuration information 323a includes information for reconfiguring the DMA 281, the interrupt controller 282, and the port 283 in addition to the configuration information 323. The information conversion processing unit 310a performs a predetermined conversion based on the operation information 321a and the circuit information 322a, generates the configuration information 323a, stores the configuration information 323a in the storage unit 320, and transmits the configuration information 323a to the MCU 200a.

Figure 16:
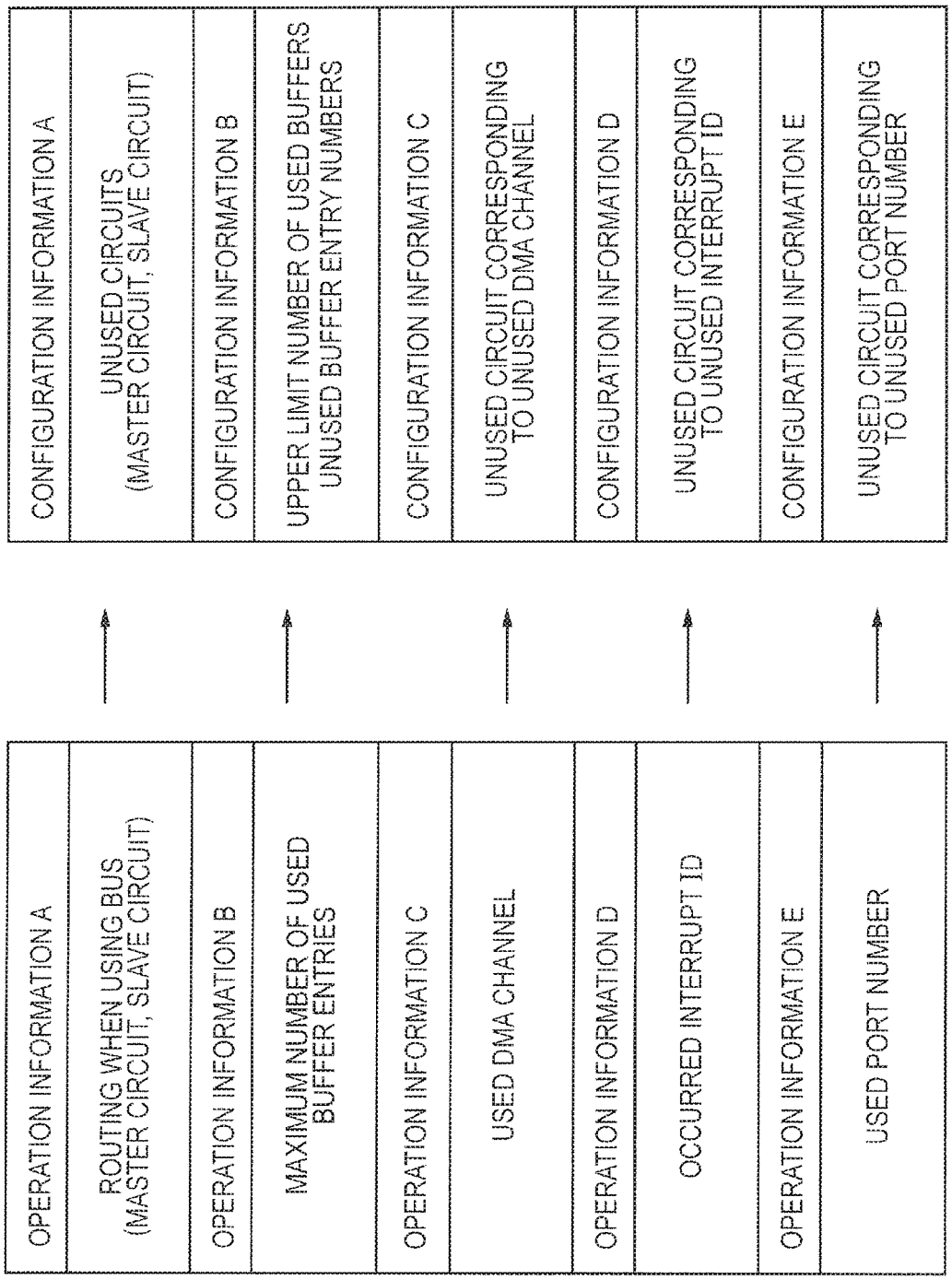
FIG. 16 is a diagram showing a relationship between operation information and configuration information according to the second embodiment.

FIG. 16 is a diagram showing a relationship between the operation information and the configuration information according to the second embodiment. For example, when operation information C is the used DMA channel, the information conversion processing unit 310a identifies an unused DMA channel that is not included in the operation information C from among channel information of DMA of the circuit information 322a, converts the unused DMA channel into an unused circuit in a DMA corresponding to the identified unused DMA channel, and defines the unused circuit as the operation information C. Further, when operation information D is a generated interrupt ID, the information conversion processing unit 310a identifies an unused interrupt ID that is not included in the operation information D from among interrupt IDs that can be generated by the interrupt controller in the circuit information 322a, converts the unused interrupt ID into an unused circuit in an interrupt controller corresponding to the identified unused interrupt ID, and defines the unused circuit as the operation information D. Further, when operation information E is an generated used port number, the information conversion processing unit 310a identifies an unused port number that is not included in the operation information E from among port numbers of ports in the circuit information 322a, converts the unused port number into an unused circuit in a port corresponding to the identified unused port number, and defines the unused circuit as the operation information E.

Figure 17:
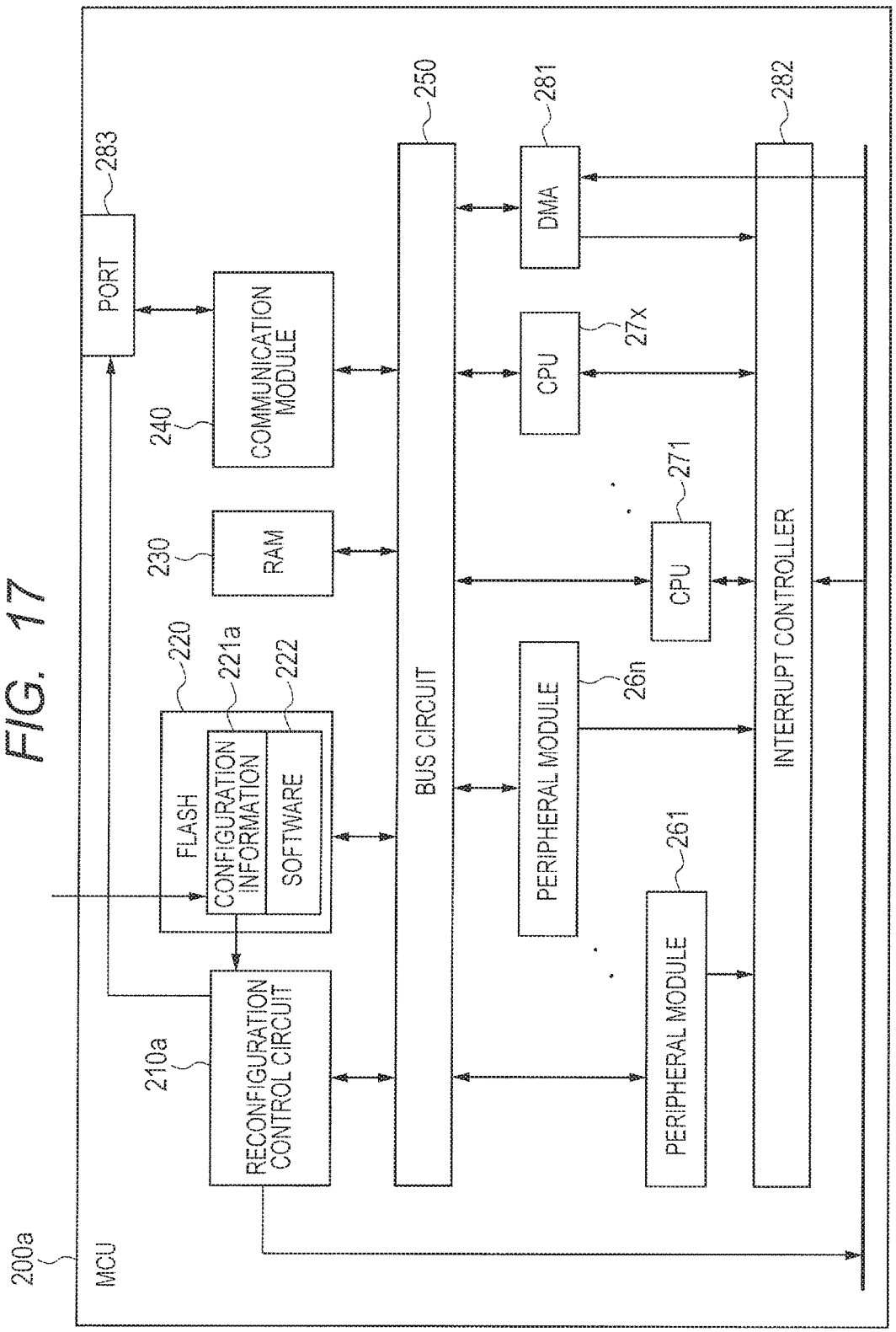
FIG. 17 is a block diagram showing a configuration of an MCU according to the second embodiment.

FIG. 17 is a block diagram showing a configuration of the MCU 200a according to the second embodiment. The MCU 200a is a unit obtained by improving the MCU 200 described above. In the MCU 200a, the reconfiguration control circuit 210 is replaced by a reconfiguration control circuit 210a, and a DMA 281, an interrupt controller 282, and a port 283 are added. The DMA 281, the interrupt controller 282, and the port 283 have the same configurations as those of the DMA 181, the interrupt controller 182, and the port 183 described above. The FLASH 220 stores configuration information 221a received from the information processing device 300a. The reconfiguration control circuit 210a reads the configuration information 221a from the FLASH 220 when the MCU 200a starts up. Then, the reconfiguration control circuit 210a issues an instruction to configurations in the bus circuit 250, the DMA 281, the interrupt controller 282, and the port 283 based on the read configuration information 221a.

The reconfiguration control circuit 210a inactivates an unused circuit of a corresponding configuration based on the configuration information C, the configuration information D, and the configuration information E. Thereby, it is possible to further reduce the power consumption as compared with the first embodiment.

<Third Embodiment>

The third embodiment is an improved example of the first embodiment. Specifically, the configuration information is information associated with each interrupt processing that occurs when the specific software is executed. When the interrupt processing occurs while the specific software is executed, the control circuit identifies the configuration information corresponding to the interrupt processing from inside the storage unit. Then, the control circuit controls the bus circuit based on the identified configuration information. After the interrupt processing is completed, the control circuit controls the bus circuit based on the configuration information before the occurrence of the interrupt processing. Thereby, it is possible to finely reduce the power consumption for each interrupt processing.

Figure 18:
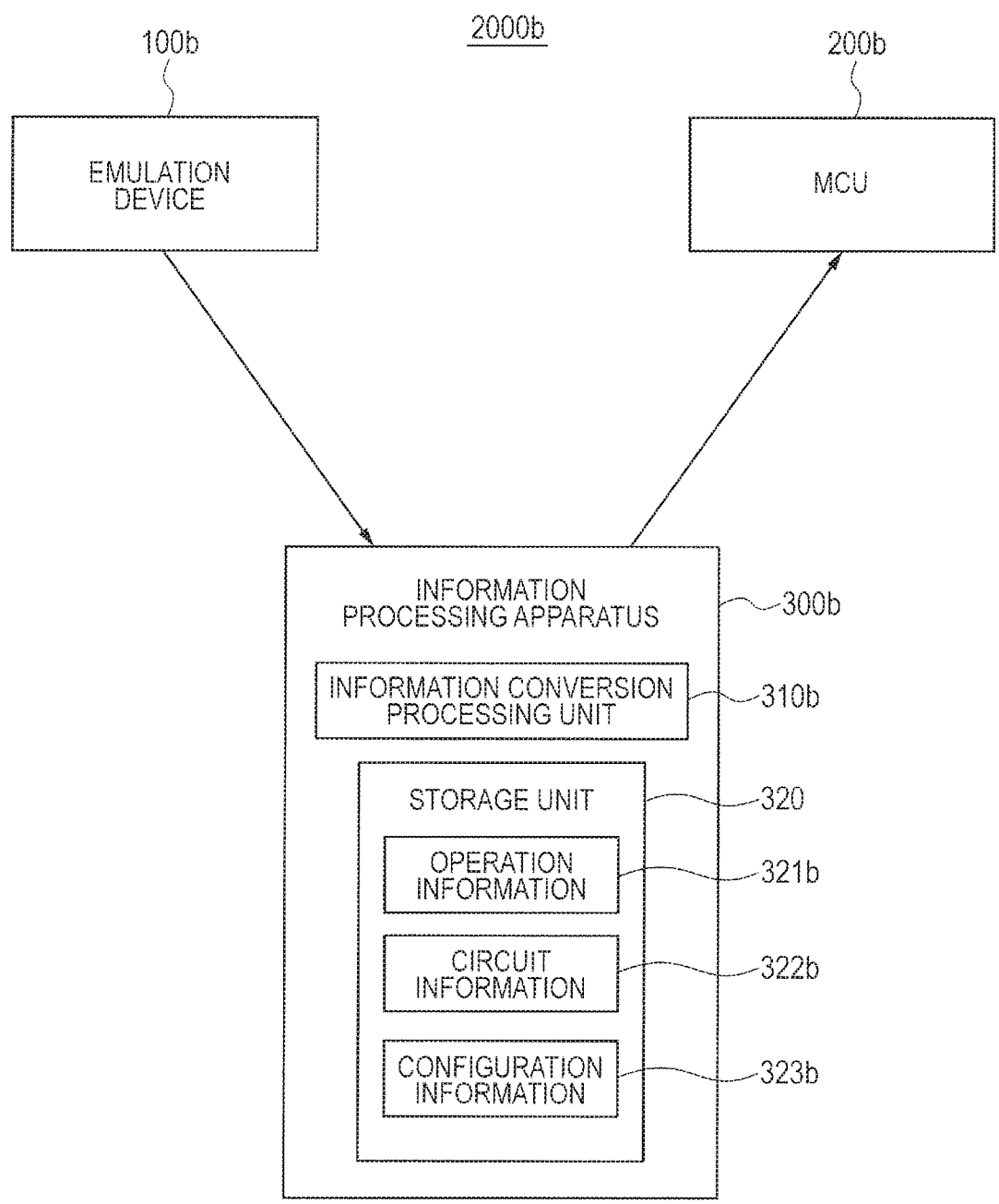
FIG. 18 is a block diagram showing a configuration of a reconfiguration control system of a semiconductor device according to a third embodiment.

FIG. 18 is a block diagram showing a configuration of a reconfiguration control system 2000b of a semiconductor device according to the third embodiment. The reconfiguration control system 2000b includes an emulation device 100b, an MCU 200b, and an information processing device 300b.

Figure 19:
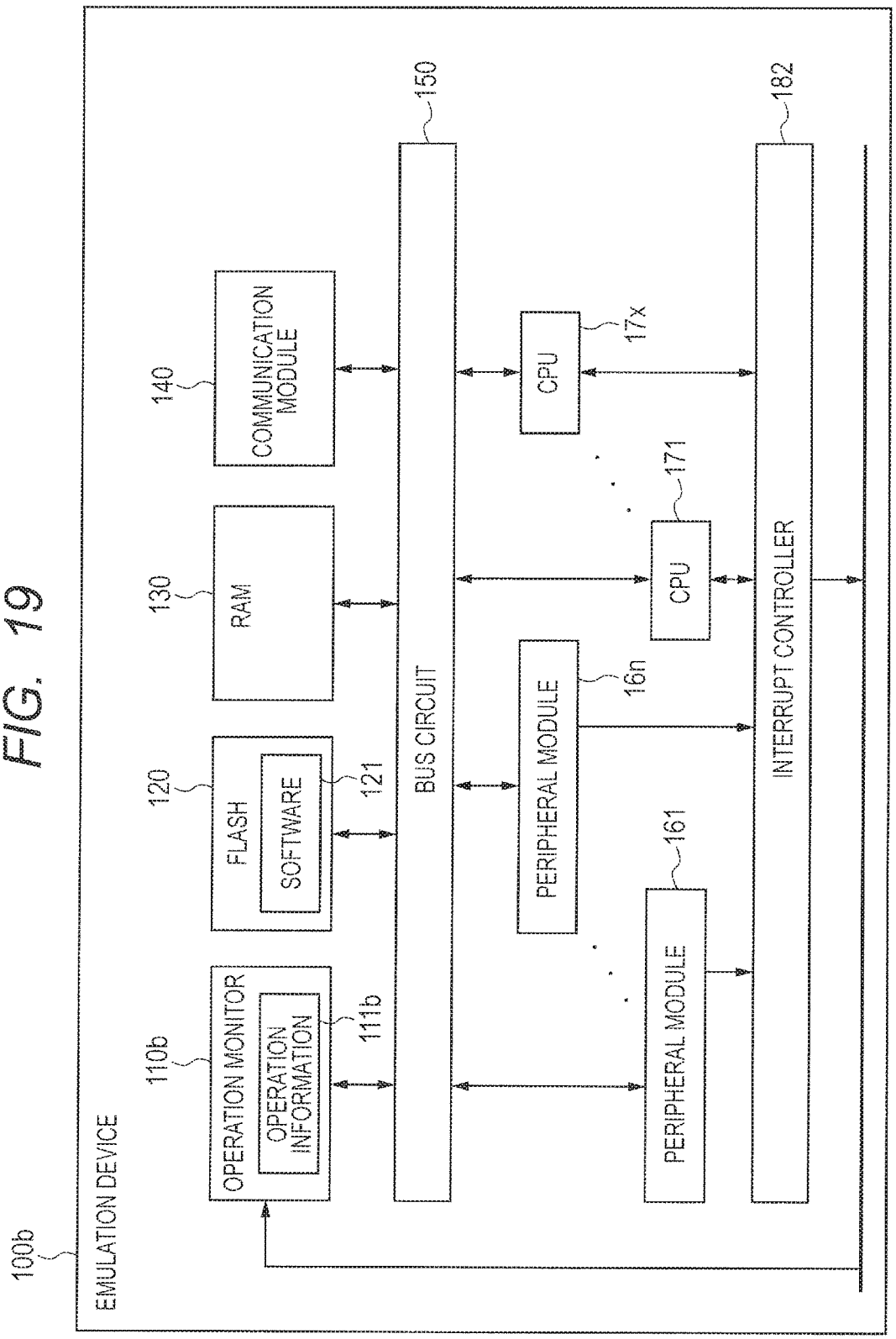
FIG. 19 is a block diagram showing a configuration of an emulation device according to the third embodiment.

FIG. 19 is a block diagram showing a configuration of the emulation device 100b according to the third embodiment. The emulation device 100b is a device obtained by improving the emulation device 100 described above. In the emulation device 100b, the operation monitor 110 is replaced by the operation monitor 110b, and an interrupt controller 182 is added.

The operation monitor 110b observes an operation state of each circuit when the software 121 is executed, acquires operation information 111b, and stores the operation information 111b inside the operation monitor 110b. In particular, the operation monitor 110b acquires an interrupt ID when an interrupt request is issued from the interrupt controller 182. Then, the operation monitor 110b stores operation information acquired during interrupt processing in association with the acquired interrupt ID. The operation monitor 110b repeats the above operation every time an interrupt request occurs.

The information processing device 300b is a device obtained by improving the information processing device 300 described above. The information processing device 300b includes an information conversion processing unit 310b and a storage unit 320. The storage unit 320 stores operation information 321b, circuit information 322b, and configuration information 323b. The operation information 321b is information where the operation information 111b described above is stored. The circuit information 322b includes a list of interrupt IDs of an interrupt controller 282 included in the MCU 200b in addition to the circuit information 322. The configuration information 323b is information where the configuration information 323 is associated with each interrupt ID. The information conversion processing unit 310b performs a predetermined conversion based on the operation information 321b and the circuit information 322b, generates the configuration information 323b, stores the configuration information 323b in the storage unit 320, and transmits the configuration information 323b to the MCU 200b.

FIG. 20 is a diagram showing a relationship between the operation information and the configuration information according to the third embodiment. Here, an interrupt ID0, an interrupt ID1, and an interrupt ID2 are associated with each of the operation information A and the operation information B. Therefore, the interrupt ID0, the interrupt ID1, and the interrupt ID2 are also associated with each of the configuration information A and the configuration information B.

Figure 21:
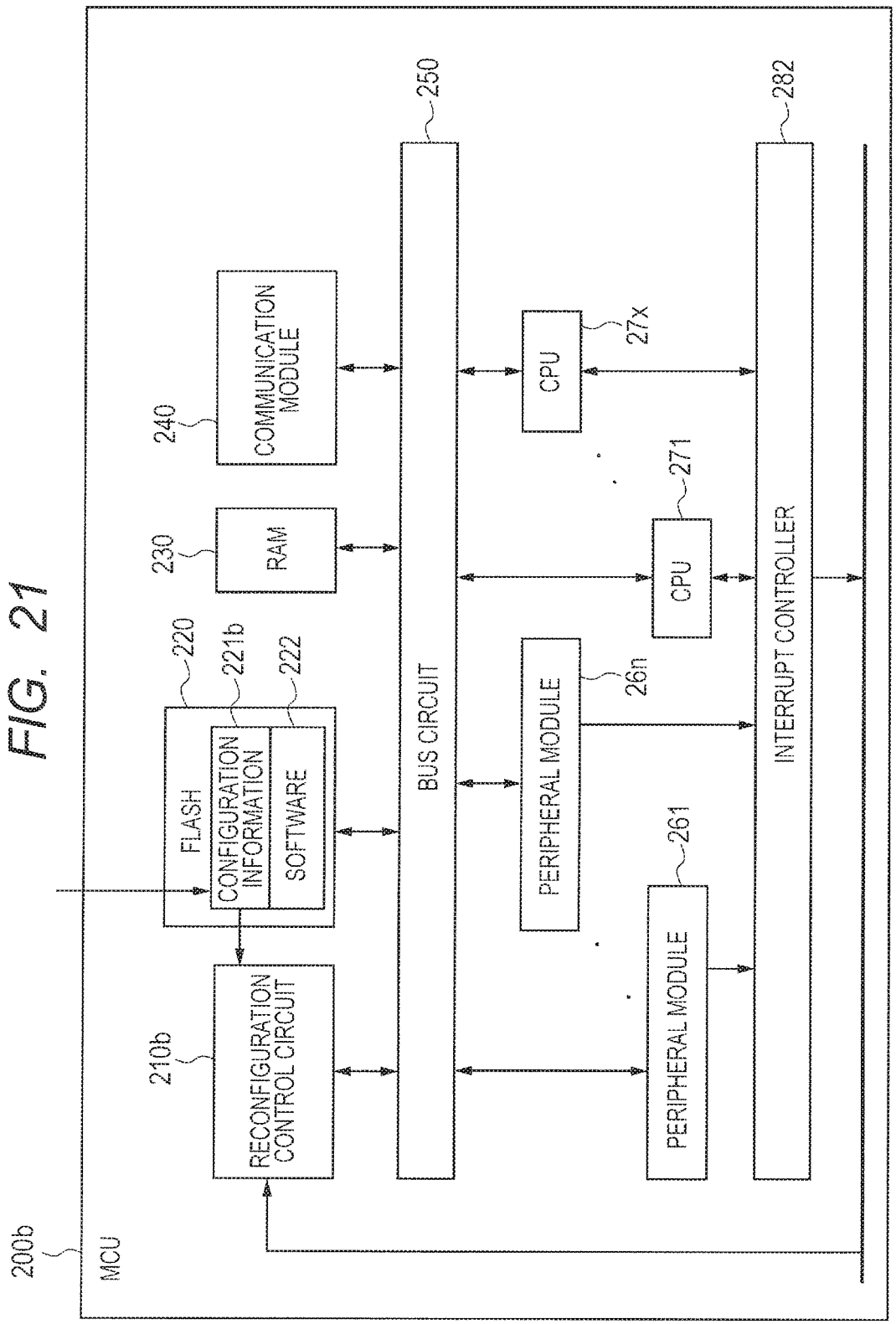
FIG. 21 is a block diagram showing a configuration of an MCU according to the third embodiment.

FIG. 21 is a block diagram showing a configuration of the MCU 200b according to the third embodiment. The MCU 200b is a unit obtained by improving the MCU 200 described above. In the MCU 200b, the reconfiguration control circuit 210 is replaced by a reconfiguration control circuit 210b, and an interrupt controller 282 is added. The FLASH 220 stores configuration information 221b received from the information processing device 300b. The reconfiguration control circuit 210b reads the configuration information 221b from the FLASH 220 when the MCU 200b starts up. While the software 222 is being executed, the reconfiguration control circuit 210b issues an instruction to a configuration in the bus circuit 250 based on the read configuration information 221b every time an interrupt occurs or is completed.

Figure 22:
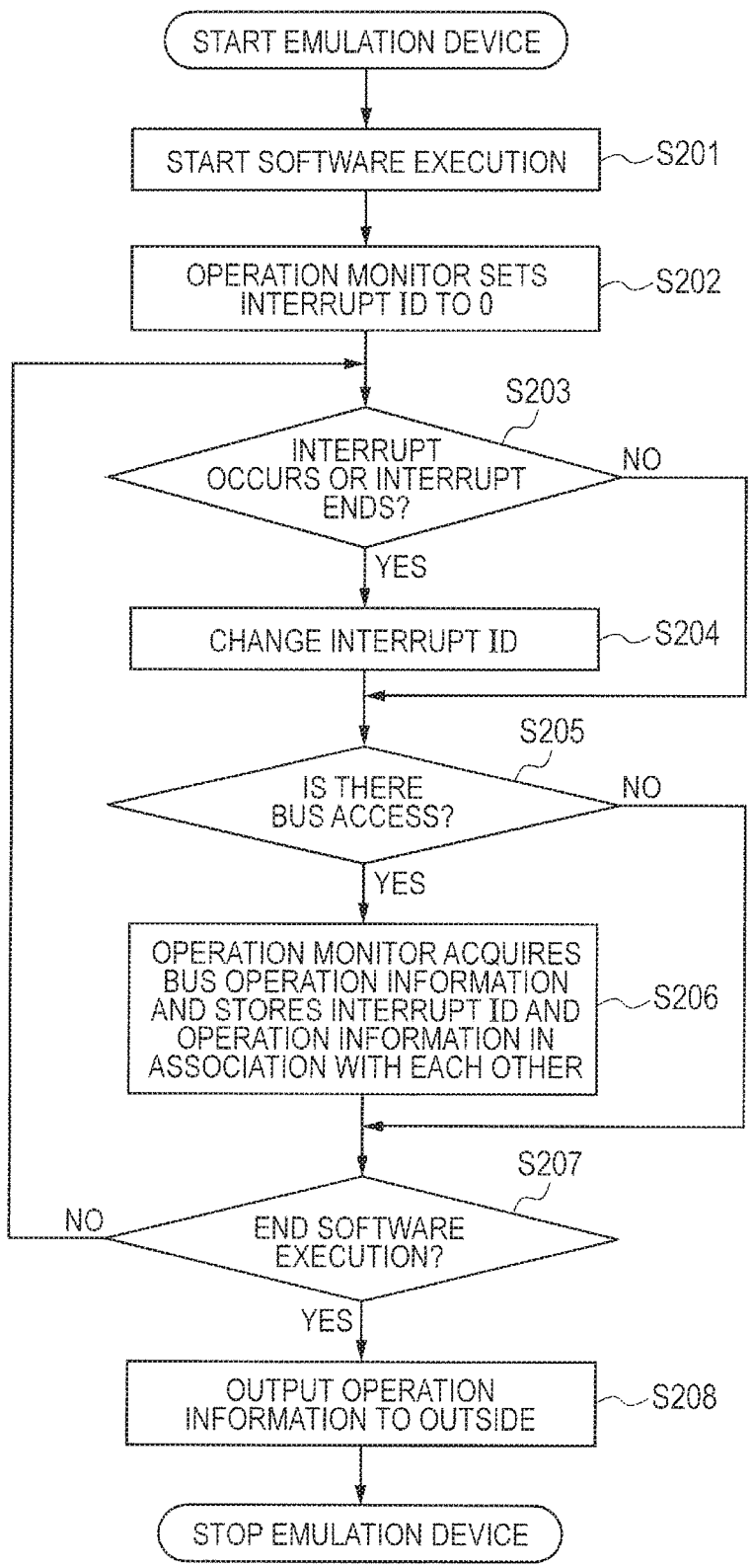
FIG. 22 is a flowchart showing flow of operation information acquisition processing according to the third embodiment.

FIG. 22 is a flowchart showing flow of operation information acquisition processing according to the third embodiment. First, the emulation device 100b starts up. Then, one of the CPUs 171 to 17x reads the software 121 to be developed from the FLASH 120 and executes the software 121 (S201). The operation monitor 110b sets the interrupt ID to 0 (S202). Specifically, the operation monitor 110b sets the interrupt ID to 0 when a main program is executed.

Subsequently, the operation monitor 110b monitors access to the bus circuit 150 and an interrupt signal from the interrupt controller 182. The operation monitor 110b determines whether an interrupt occurs or ends (S203). When an interrupt neither occurs nor ends, the operation monitor 110b proceeds to step S205. On the other hand, when an interrupt occurs or ends, the operation monitor 110b changes the interrupt ID (S204). For example, when an interrupt occurs, the operation monitor 110b receives a notification of interrupt request from the interrupt controller 182 and changes the interrupt ID to an ID indicated by the interrupt request. When the interrupt ends, the operation monitor 110b changes the interrupt ID to a value corresponding to processing of a return destination.

Then, the operation monitor 110b determines whether or not a bus access occurs (S205). When no bus access occurs, the operation monitor 110b proceeds to step S207. On the other hand, when a bus access occurs, the operation monitor 110b acquires the operation information 111b of the bus circuit 150 and stores the operation information 111b in association with the interrupt ID.

Thereafter, the emulation device 100b determines whether or not the execution of the software 121 is completed (S207). When the execution of the software 121 is not completed, the emulation device 100b returns to step S203. On the other hand, when the execution of the software 121 is completed, the operation monitor 110b outputs the operation information 111b to the information processing device 300b through the communication module 140 (S208). Then, the information processing device 300b receives the operation information 111b and stores the operation information 111b into the storage unit 320 as the operation information 321b.

Figure 23:
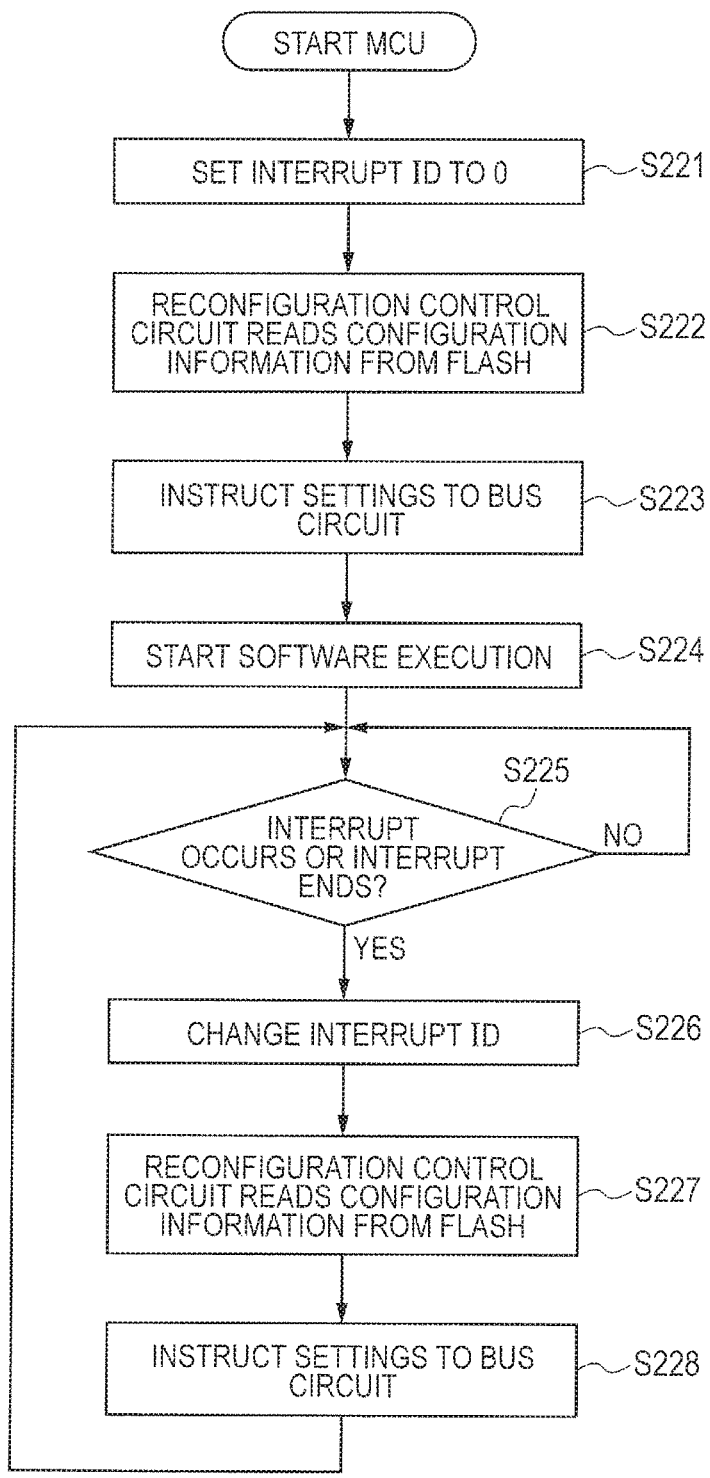
FIG. 23 is a flowchart showing flow of reconfiguration processing according to the third embodiment.

FIG. 23 is a flowchart showing flow of reconfiguration processing according to the third embodiment. The MCU 200 starts up. Then, the reconfiguration control circuit 210b sets the interrupt ID to 0 (S221). Then, the reconfiguration control circuit 210b reads the configuration information 221b from the FLASH 220 (S222). Next, the reconfiguration control circuit 210b issues various settings to the bus circuit 250 based on the configuration information 221b (S223). Specifically, the reconfiguration control circuit 210b identifies configuration information associated with the interrupt ID0 and issues various settings to the bus circuit 250 based on the identified configuration information. Thereby, the bus circuit 250 can be reconfigured with the interrupt ID0.

Thereafter, one of the CPUs 271 to 27x reads the software 222 from the FLASH 220 and executes the software 222 (S224). Then, the reconfiguration control circuit 210b monitors an interrupt signal from the interrupt controller 282. The reconfiguration control circuit 210b determines whether an interrupt occurs or ends (S225). When an interrupt neither occurs nor ends, the reconfiguration control circuit 210b returns to step S225. On the other hand, when an interrupt occurs or ends, the reconfiguration control circuit 210b changes the interrupt ID (S226). For example, when an interrupt occurs, the reconfiguration control circuit 210b receives a notification of interrupt request from the interrupt controller 282 and changes the interrupt ID to an ID indicated by the interrupt request. When the interrupt ends, the reconfiguration control circuit 210b changes the interrupt ID to a value corresponding to processing of a return destination.

Thereafter, the reconfiguration control circuit 210b reads the configuration information 221b from the FLASH 220 (S227). Next, the reconfiguration control circuit 210b identifies configuration information associated with the current interrupt ID and issues various settings to the bus circuit 250 based on the identified configuration information (S228). Thereby, the bus circuit 250 can be reconfigured with the current interrupt ID. Then, the reconfiguration control circuit 210b returns to step S225.

In this way, the circuit configuration can be optimized for each interrupt processing by the present embodiment. Therefore, it is possible to further reduce the power consumption as compared with the first embodiment.

While the invention made by the inventors has been specifically described based on the embodiments, it is needless to say that the invention is not limited to the embodiments that have been described, but can be variously changed without departing from the scope of the invention.

What is claimed is:

1. A semiconductor device comprising:
a plurality of circuits;
a bus circuit including 1) a plurality of arbitration circuits each of which selects one of access requests from at least two of the circuits and 2) a plurality of buffers that temporarily store communication data corresponding to the selected access request;
a storage unit that stores 1) information based on a use state of the buffers during communication between the circuits and 2) configuration information including designation of unused circuits that are not used for the communication from among the circuits; and
a control circuit that controls the bus circuit so as to stop use of unused buffers that are not used for the communication from among the buffers and at least a partial configuration in arbitration circuits corresponding to the unused circuits from among the arbitration circuits based on the configuration information,
wherein the unused circuits are circuits that are not used as a master circuit or a slave circuit in the communication among the circuits,
wherein the bus circuit further includes a first arbitration circuit that arbitrates a plurality of accesses from the master circuit or the slave circuit among the arbitration circuits,
wherein the control circuit controls the bus circuit so as to stop supply of a clock signal to at least a partial configuration in the first arbitration circuit corresponding to the designated unused circuits, wherein the bus circuit further includes a second arbitration circuit that arbitrates a plurality of accesses to the master circuit or the slave circuit among the arbitration circuits, and
wherein the control circuit controls the bus circuit so as to stop supply of a clock signal to the second arbitration circuit corresponding to the designated unused circuits.

2. The semiconductor device according to claim 1, wherein the bus circuit further includes a selection circuit that selects a buffer to be accessed from among the buffers, and
wherein the control circuit instructs stop of supply of a clock signal to the unused buffers among the buffers, and instructs the selection circuit not to select the unused buffers.

3. The semiconductor device according to claim 2, wherein the configuration information includes a maximum number of used buffers in the communication among the buffers, and
wherein the control circuit instructs the selection circuit to select buffers, the number of which is smaller than or equal to the maximum number of used buffers among the buffers.

4. The semiconductor device according to claim 3, wherein the configuration information further includes buffers, the number of which is obtained by subtracting the maximum number of used buffers from a total number of the buffers, as the unused buffers.

5. The semiconductor device according to claim 1, wherein the configuration information is information based on the use state when specific software is executed.

6. The semiconductor device according to claim 5, wherein the configuration information is information derived based on operation information acquired when the specific software is executed in another semiconductor device mounted with at least the same configuration as that of the circuits and the bus circuit.

7. The semiconductor device according to claim 5,
wherein the configuration information is information associated with each interrupt processing that occurs when the specific software is executed, and
wherein the control circuit identifies the configuration information corresponding to the interrupt processing from inside the storage unit when the interrupt processing occurs while the specific software is executed, controls the bus circuit based on the identified configuration information, and controls the bus circuit based on the configuration information before an occurrence of the interrupt processing after the interrupt processing is completed.

8. The semiconductor device according to claim 5,
wherein the configuration information includes interrupt notification by an interrupt controller included in the semiconductor device, a channel used by DMA (Direct Memory Access), or designation of unused circuits identified based on a port of a communication port, which are used when the specific software is executed, and
wherein the control circuit controls the interrupt controller, the DMA, or the communication port so as to stop supply of a clock signal to a configuration corresponding to the designated unused circuits when the specific software is executed.

9. A reconfiguration control method of a semiconductor device including a plurality of circuits, a bus circuit including a plurality of arbitration circuits each of which selects one of access requests from at least two of the circuits and a plurality of buffers that temporarily store communication data corresponding to the selected access request, a storage unit that stores information based on a use state of the buffers during communication between the circuits and configuration information including designation of unused circuits that are not used for the communication from among the circuits, and a control circuit, the reconfiguration control method comprising:
reading the configuration information from the storage unit by using the control circuit; and
controlling the bus circuit so as to stop use of unused buffers that are not used for the communication from among the buffers and at least a partial configuration in arbitration circuits corresponding to the unused circuits from among the arbitration circuits based on the configuration information by using the control circuit,
wherein the unused circuits are circuits that are not used as a master circuit or a slave circuit in the communication among the circuits,
wherein the bus circuit further includes a first arbitration circuit that arbitrates a plurality of accesses from the master circuit or the slave circuit among the arbitration circuits,
wherein the control circuit controls the bus circuit so as to stop supply of a clock signal to at least a partial configuration in the first arbitration circuit corresponding to the designated unused circuits, wherein the bus circuit further includes a second arbitration circuit that arbitrates a plurality of accesses to the master circuit or the slave circuit among the arbitration circuits, and
wherein the control circuit controls the bus circuit so as to stop supply of a clock signal to the second arbitration circuit corresponding to the designated unused circuits.

10. The reconfiguration control method of a semiconductor device according to claim 9, further comprising:
acquiring operation information related to the communication between the circuits when specific software is executed in another semiconductor device mounted with at least the same configuration as that of the circuits and the bus circuit;
deriving the configuration information based on the operation information;
storing the configuration information in the storage unit; and
reading the configuration information from the storage unit when the specific software is executed in the semiconductor device.

\* \* \* \* \*